(12) United States Patent
Ben-Dor

(10) Patent No.: US 9,841,121 B2
(45) Date of Patent: Dec. 12, 2017

(54) NONLINEAR TRANSMISSION RATE BETWEEN OPERATING HANDLE AND OPERATED MECHANISM

(71) Applicant: Eran Ben-Dor, Kochav Yair-Tsur-Yigal (IL)

(72) Inventor: Eran Ben-Dor, Kochav Yair-Tsur-Yigal (IL)

(*) Notice: Subject to any disclaimer, the term of this patent is extended or adjusted under 35 U.S.C. 154(b) by 250 days.

(21) Appl. No.: 14/430,566

(22) PCT Filed: Sep. 17, 2013

(86) PCT No.: PCT/IL2013/050787
§ 371 (c)(1),
(2) Date: Mar. 24, 2015

(87) PCT Pub. No.: WO2014/045281
PCT Pub. Date: Mar. 27, 2014

(65) Prior Publication Data
US 2015/0247587 A1 Sep. 3, 2015

Related U.S. Application Data

(60) Provisional application No. 61/704,656, filed on Sep. 24, 2012.

(51) Int. Cl.
*F16K 31/60* (2006.01)
*G05G 1/04* (2006.01)
(Continued)

(52) U.S. Cl.
CPC .......... *F16K 31/605* (2013.01); *E03C 1/0412* (2013.01); *F16K 11/06* (2013.01);
(Continued)

(58) Field of Classification Search
CPC ...... F16K 31/60; F16K 31/607; F16K 31/605; F16K 11/0787; F16K 11/06; G05G 9/047;
(Continued)

(56) References Cited

U.S. PATENT DOCUMENTS 2,609,205 A * 9/1952 Moen .................. F16K 11/0565
251/229
4,333,497 A * 6/1982 Busquets .............. F16K 11/078
137/539
(Continued)

FOREIGN PATENT DOCUMENTS

CA 2446038 A1 * 4/2005 ........... B05B 1/1609
DE EP 0982441 A2 * 3/2000 ............... E03C 1/04
(Continued)

OTHER PUBLICATIONS

International Search Report of Application No. PCT/IL2013/050787 mailed on Jan. 12, 2014.
(Continued)

*Primary Examiner* — Matthew W Jellett
*Assistant Examiner* — Christopher Ballman
(74) *Attorney, Agent, or Firm* — Pearl Cohen Zedek Latzer Baratz LLP

(57) ABSTRACT

Device and method are disclosed for transforming an angular movement changing linearly to a linear movement changing non-linearly with respect to the linear change of the angular movement. Embodiments of the device and method may be useful for on providing better and more accurate control of a user of the amount of fluid flowing from a faucet at the low flow rates. According to other embodiments a flow diversion plate is disclosed adapted to divert the flow entering the plate through one facet of the
(Continued)

plate at a input location to an outlet opening diverted away from the input location by an angular diversion of between 90 to 180 degrees.

6 Claims, 22 Drawing Sheets

(51) Int. Cl.
| | |
|---|---|
| *G05G 9/047* | (2006.01) |
| *E03C 1/04* | (2006.01) |
| *F16K 11/06* | (2006.01) |
| *F16K 11/078* | (2006.01) |
| *G05G 5/02* | (2006.01) |

(52) U.S. Cl.
CPC .......... *F16K 11/0787* (2013.01); *F16K 31/60* (2013.01); *G05G 1/04* (2013.01); *G05G 5/02* (2013.01); *G05G 9/047* (2013.01); *G05G 9/04737* (2013.01); *Y10T 74/20201* (2015.01); *Y10T 137/86823* (2015.04)

(58) Field of Classification Search
CPC ........ G05G 9/04737; G05G 1/04; G05G 5/02; E03C 1/0412; Y10T 74/20201; Y10T 137/86823
USPC .......... 251/77–82, 100, 229, 235; 4/675–678
See application file for complete search history.

(56) References Cited

U.S. PATENT DOCUMENTS

| | | | | |
|---|---|---|---|---|
| 4,706,709 A * | 11/1987 | Monch | ...................... | E03C 1/04 137/597 |
| 5,342,018 A * | 8/1994 | Wu | ......................... | F16K 31/54 251/250 |
| 5,592,971 A * | 1/1997 | Knapp | ................ | F16K 11/0782 137/625.41 |
| 5,794,650 A * | 8/1998 | Nikolayczik | .......... | F16J 15/166 137/454.2 |
| 5,810,050 A * | 9/1998 | Pickerrell | ............. | F16K 11/087 137/625.4 |
| 5,857,489 A * | 1/1999 | Chang | ................. | F16K 11/0787 137/625.17 |
| 5,992,457 A * | 11/1999 | Humpert | ............... | F16K 31/605 137/625.17 |
| 6,199,586 B1 * | 3/2001 | Pawelzik | .................. | E03C 1/04 137/625.17 |
| 6,298,875 B1 * | 10/2001 | Warshawsky | ......... | F16K 31/602 137/606 |
| 6,394,133 B1 * | 5/2002 | Knapp | .................. | E03C 1/0404 137/615 |
| 7,044,162 B2 * | 5/2006 | Bolgar | .................. | F16K 11/078 137/625.17 |
| 7,063,106 B2 * | 6/2006 | Knapp | ................ | F16K 11/0787 137/625.17 |
| 2004/0231735 A1 * | 11/2004 | Haenlein | ............. | F16K 11/0746 137/636.3 |
| 2008/0023085 A1 | 1/2008 | Rosko et al. | | |
| 2008/0223462 A1 * | 9/2008 | Assenmacher | .......... | E03C 1/04 137/597 |
| 2009/0025808 A1 * | 1/2009 | Kacik | ................. | F16K 11/0787 137/625 |
| 2009/0032128 A1 * | 2/2009 | Tucker | ................ | F16K 11/0787 137/625 |
| 2012/0018009 A1 * | 1/2012 | Veros | ........................ | E03C 1/04 137/454.2 |
| 2012/0042956 A1 | 2/2012 | Ben-Dor | | |

FOREIGN PATENT DOCUMENTS

| | | | | |
|---|---|---|---|---|
| JP | WO 2010071083 A1 * | 6/2010 | ............. | B67D 3/043 |
| WO | WO 2013021388 | 2/2013 | | |

OTHER PUBLICATIONS

Japanese Office Action for Application No: 2015-532576 dated on Sep. 12, 2017.

* cited by examiner

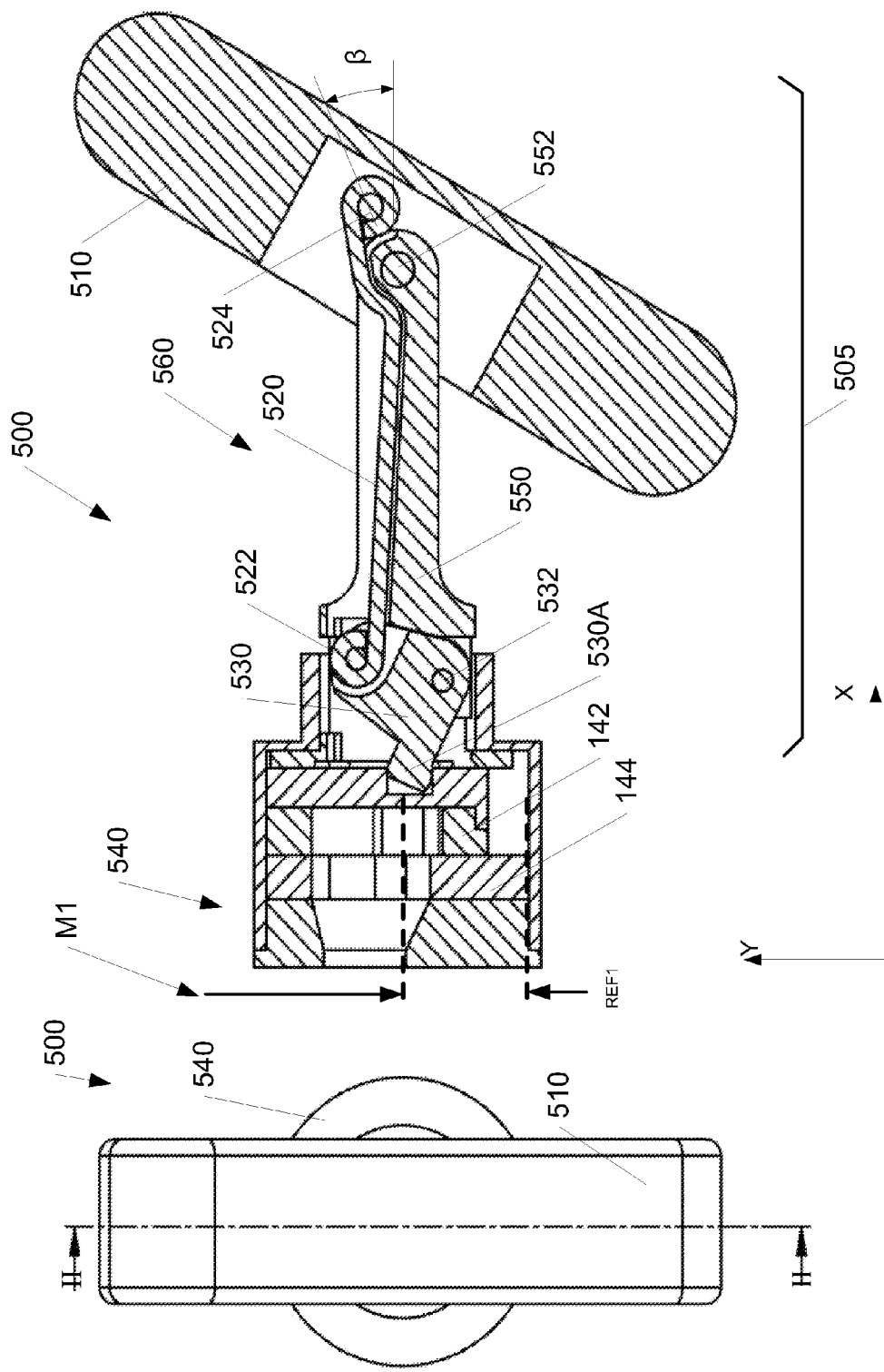

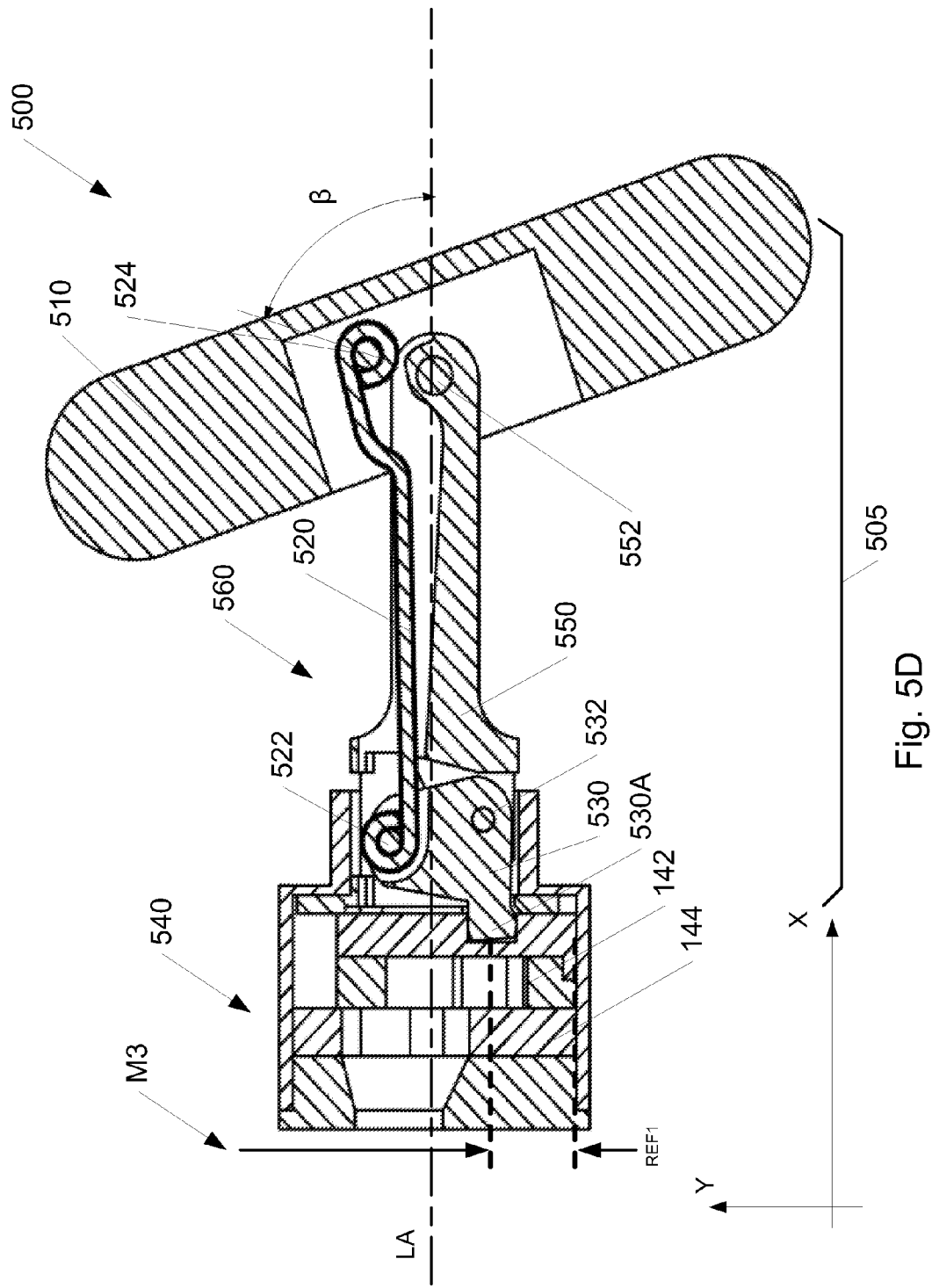

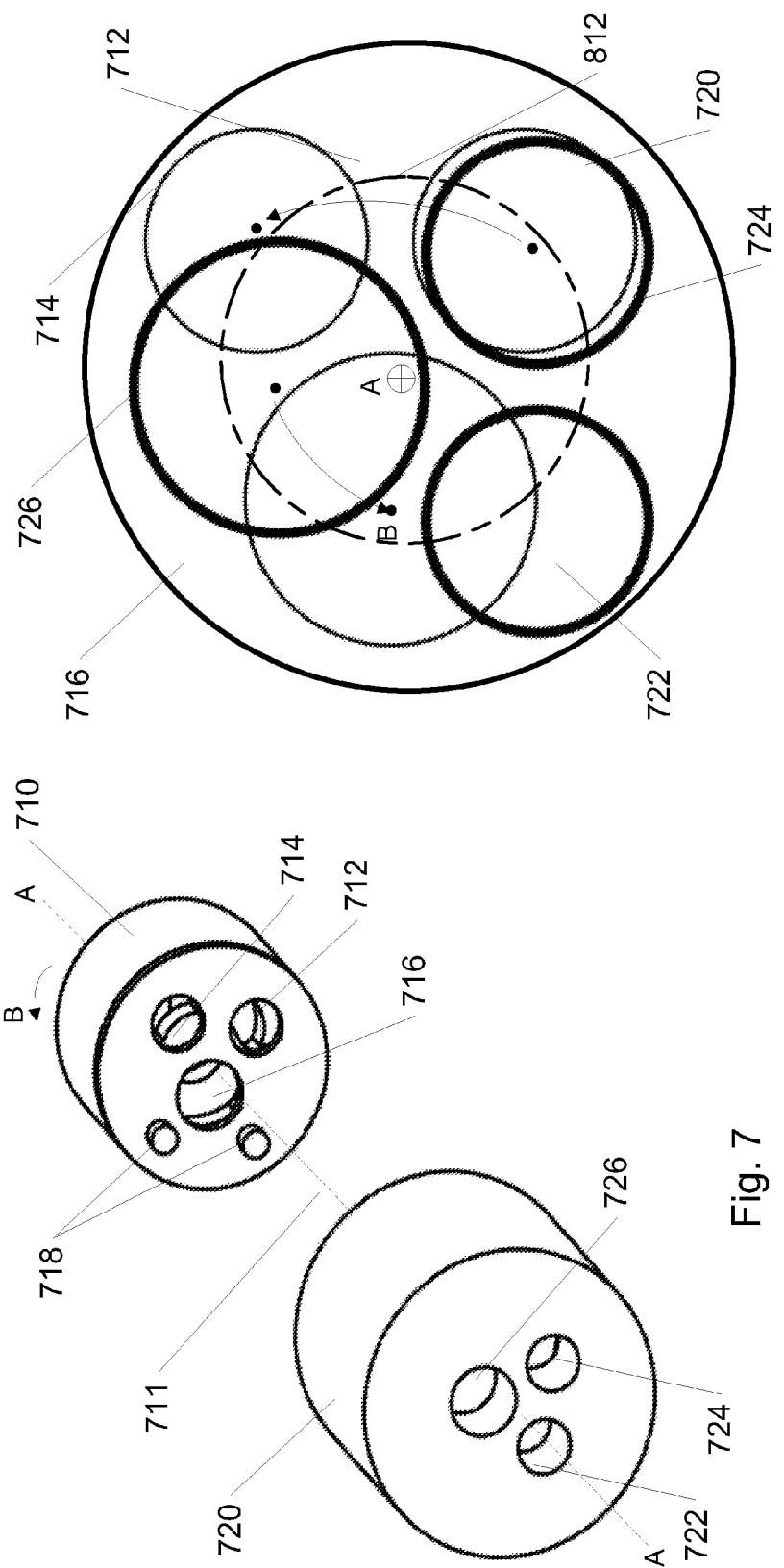

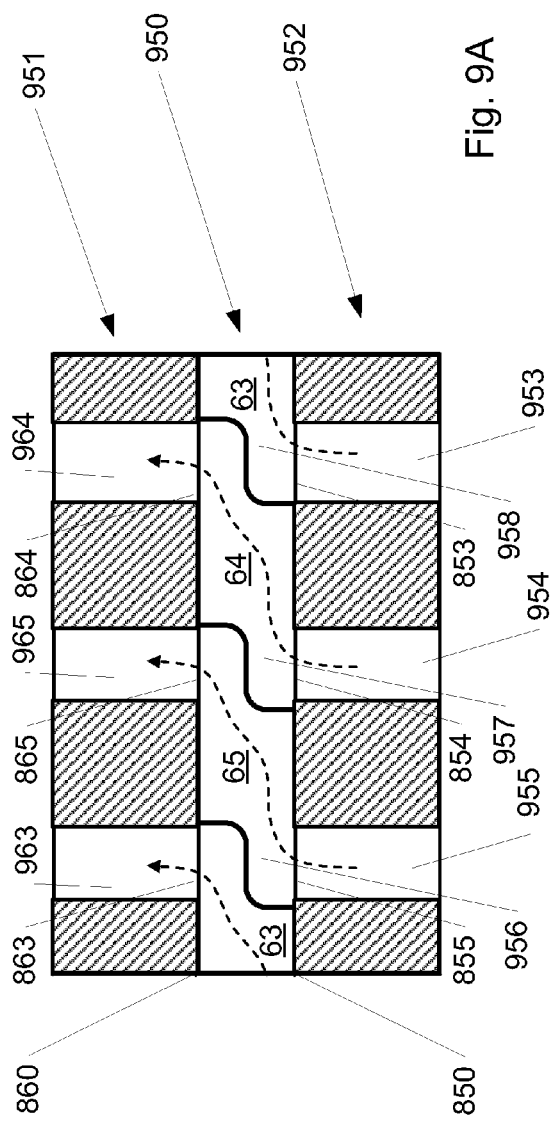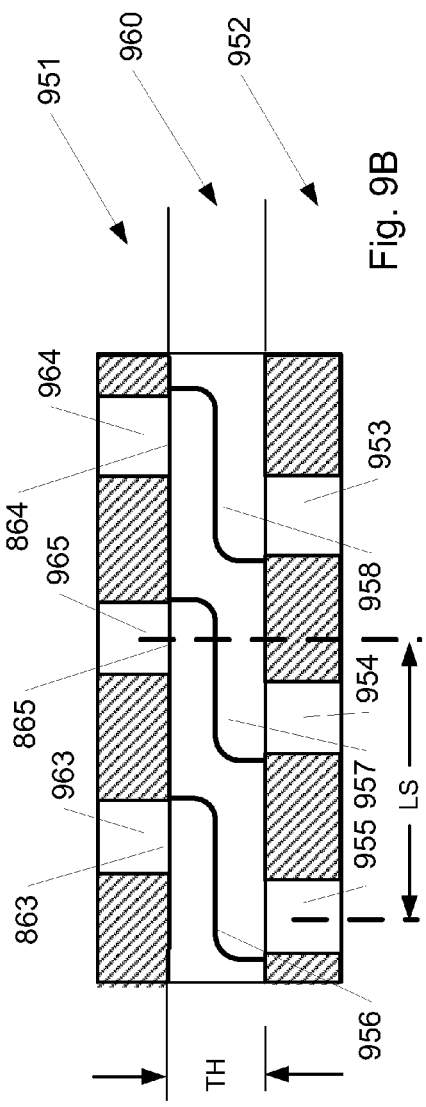

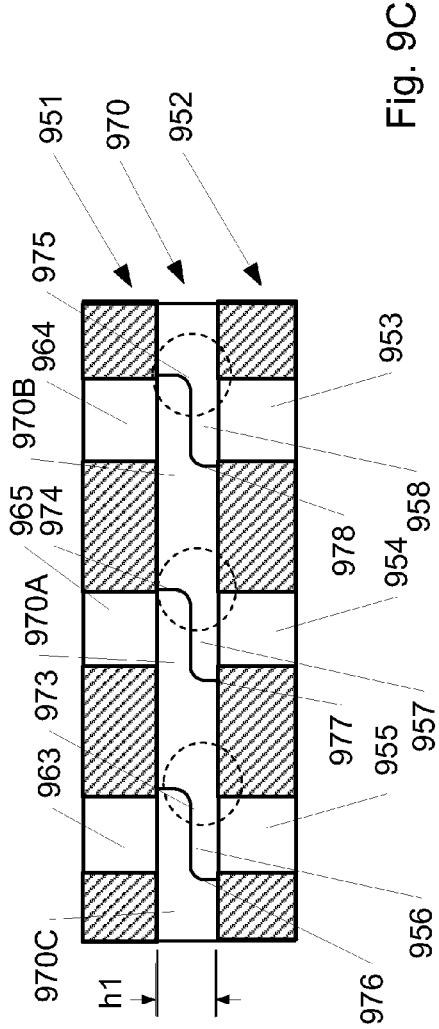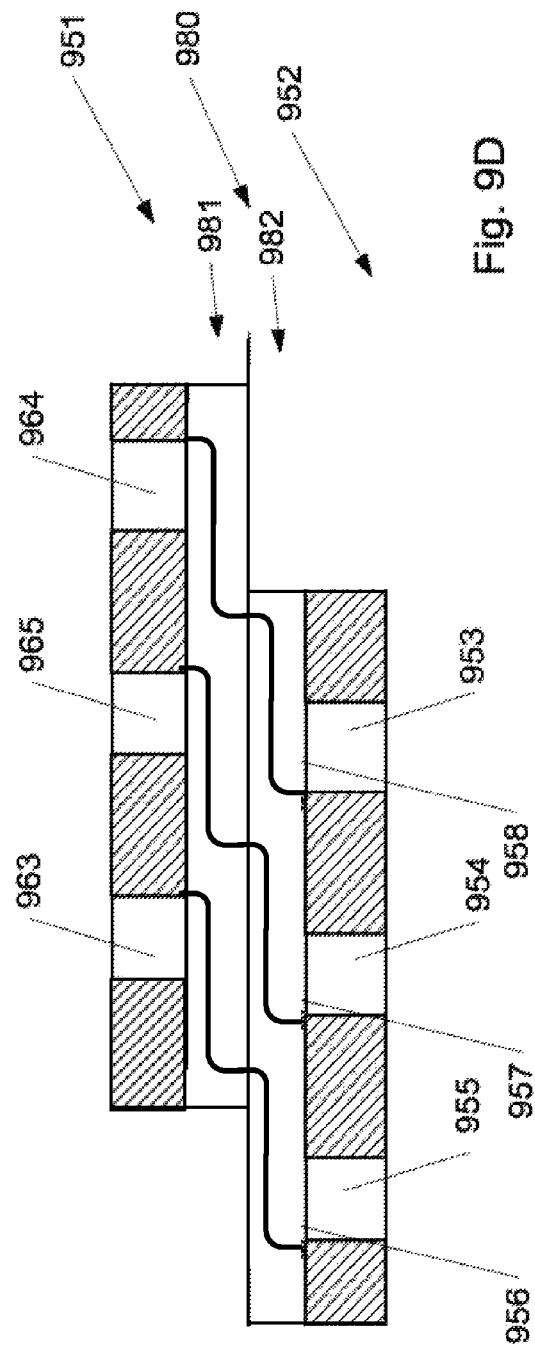

CROSS SECTION AA

NONLINEAR TRANSMISSION RATE BETWEEN OPERATING HANDLE AND OPERATED MECHANISM

CROSS-REFERENCE TO RELATED APPLICATIONS

This application is a National Phase Application of PCT International Application No. PCT/IL2013/050787, International Filing Date Sep. 17, 2013, entitled "Nonlinear Transmission Rate Between Operating Handle and Operated Mechanism" published on Mar. 27, 2014 as International Publication No. WO 2014/045281, claiming priority of U.S. Provisional Patent Application No. 61/704,656, filed Sep. 24, 2012, which is incorporated herein by reference in its entirety.

BACKGROUND OF THE INVENTION

Single lever mixer faucets typically include a cartridge that may set the water flow strength and the relative mixture of cold and hot water. The cartridge may include base static plate and a movable plate. The base static plate includes two inlets to allow entrance of hot and cold water, respectively, into the cartridge and a third opening to allow exit of mixed water. The movable plate includes a single opening that in closed position does not overlap any of the inlets, and in open position overlaps at least part of one or both of the inlets. The movable plate is moved with relation to base static plate by a lever of the cartridge. Water flow rate is controlled by moving a handle of the faucet in one plane (herein after the stream strength control plane which tilts the lever of the cartridge.

Reference is now made to FIG. 1A which is a schematic front view illustration of prior art cartridge 140 and handle 110 of a faucet 100, and to FIGS. 1B and 1C which are cross sectional views of faucet 100, in closed and opened positions, respectively, along axis I-I, marked on FIG. 1A. Handle 110 is firmly fixed to lever 120. Lever 120 is rotatable about pivoting point 130. In the closed position, depicted in FIG. 1B, the single opening of movable plate 142 does not overlap any of the inlets of static plate 144. In the opened position, depicted in FIG. 1C, handle 110 is lifted, lever 120 is rotated and movable plate 142 is shifted with respect to the closed position and the single opening of movable plate 142 overlaps at least part of one or both of the inlets of static plate 144. Movable plate 142 and static plate 144 may be made of ceramic material or include ceramic parts. Additionally or alternatively, parts of movable plate 142 and static plate 144 may be made from various materials or from combinations of materials, such as plastic plates, rubber rings, Teflon cylinder etc. Cartridge 140 may include a base plate 146 that has on one facet openings that match the openings of the static plate which change through base plate 146 into circular openings that match the water supply inlets and outlet of the faucet.

Reference is now made to FIG. 2 which is a schematic diagram representing a handle and a lever of a prior art faucet depicted in relation to a Cartesian axes system including axes x and y. Line 210 represents handle 110 and line 220 represents lever 120 depicted in FIGS. 1A and 1B. Lines 210 and 220 are depicted in the opened position of the faucet, axis x is located where line 220 is placed when in closed position and axis y is perpendicular to x axis. When handle 110 is rotated from being perpendicular to x axis to an angle of α (alpha), movable plate 142 is shifted by h=r sin α, where r is the length of lever 120 from pivoting point 230 to the connection of lever 120 to movable plate 142. For small values of α, for example for α values smaller than 30 degrees or 0.52 radians, sin α≈α, and therefore, h is substantially proportional to α. FIG. 3 presents a graph relating h and α of an exemplary prior art faucet. It is apparent that the relation is substantially linear in the depicted range.

One could assume that the flow rate of water would, therefore, be proportional to α, the angle of rotation of handle 110. However, as a result of the dynamics of the water flow, affected by the water pressure at the entrance of the faucet and by the effect of various sizes of openings on the water flow, the flow rate of water is not exactly proportional to the angle of rotation of the handle. This effect is perceived to be grater than it really is as a result of subjective experience of the user. Thus, the flow rate when handle 110 is shifted at 25% of its range of motion from closed position is perceived as very strong. The flow rate when handle 110 is shifted at 50% of its range of motion from closed position is perceived as so strong, that a typical user assumes this flow rate is close to the maximal available flow rate. The level of change in flow rate of water when handle 110 is shifted from 50% to 100% of its range of motion is perceived as insignificant by the user.

Therefore, according to the current design of the cartridge and handle, only 25% to 50% of the range of motion of the handle from its closed position is used for fine adjustments of the flow rate. The remaining range of motion is typically not used for fine adjustments of the flow rate since the user usually does not need fine adjustments at the higher flow rates. The user may find it difficult to perform fine adjustments at the low flow rate range due the small range of motion used for these fine adjustments. This difficulty is further increased due to the friction force of the mechanical mechanism of the faucet that resists the movement and the inherent difficulty of a user to perform fine hand movements required to operate the prior art handle.

SUMMARY OF THE INVENTION

Embodiments of the present invention provide a mechanical system for non-linear conversion of the rotational movements of a handle to linear movements of an operated device, for example, of a movable plate of a cartridge of a faucet. For example, the magnitude of movement of the handle required to achieve a certain magnitude of linear movement of the operated device changes as a value of parameter related to the operated device changes. For example, the magnitude of movement of the handle required to achieve a certain magnitude of linear movement of a movable plate of a cartridge of a faucet may increase as the flow rate of water flowing through the faucet decreases, so that the changes of the controlled parameter are smaller when the handle is operated close to the 'closed' position and larger when the handle is operated close to the 'fully opened' position, for the same magnitude of movement of the handle.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5A is a schematic front view illustration of cartridge, movement transformation assembly and handle of a faucet according to embodiments of the present invention;

FIGS. 5B, 5C and 5D are cross sectional views of the cartridge, movement transformation assembly and handle presented in FIG. 5A, in closed, middle and fully opened positions, respectively, along axis II-II, marked on FIG. 5A

FIG. 7 is an exploded view of a cartridge housing and a cartridge rotated by about 90° with respect to cartridge housing, according to embodiments of the present invention;

FIG. 8 is a schematic illustration of openings of a cartridge (thick lines) placed against openings of a housing, according to embodiments of the present invention;

FIGS. 9A, 9B, 9C and 9D are schematic illustrations of diversion plates according to embodiments of the present invention;

Figures 1A, 1B:
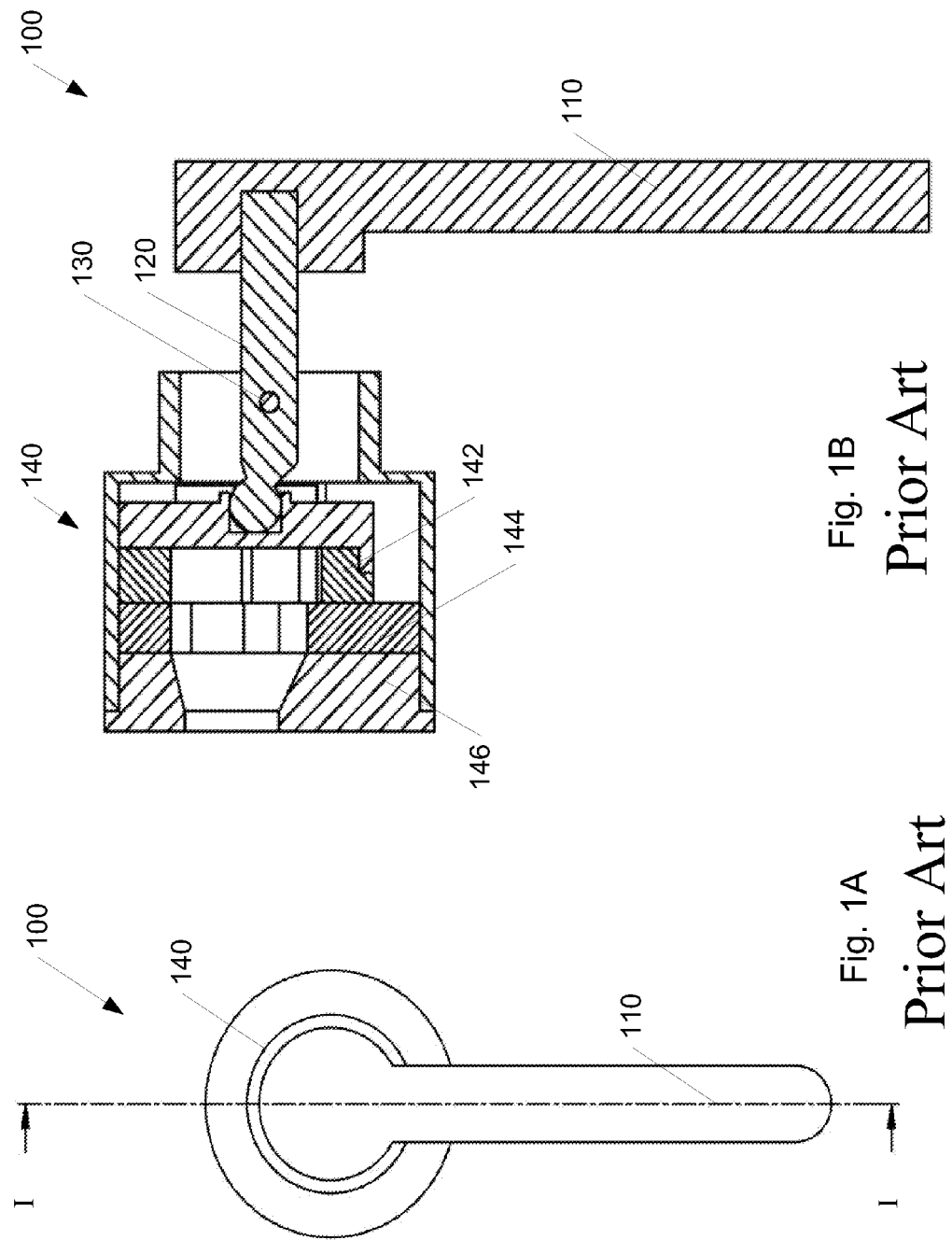
FIG. 1A is a schematic front view illustration of prior art cartridge and handle of a faucet.
FIGS. 1B and 1C are cross sectional views of the cartridge and handle presented in FIG. 1A, in closed and opened positions, respectively, along axis I-I marked on FIG. 1A.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Although embodiments of the present invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Embodiments of the present invention may include a handle, such as mechanical multiple axis handle for operating a device. The multiple axis handle may be movable about a one or more axes of rotation, such that each of the axes of rotation pass through the handle and may cross through a substantially common point, or at an area located within the handle so that the handle enables holding it on both sides of that point and the operation is carried out by turning the handle around each axis for changing a respective parameter. Such handles are described in PCT International Patent Application No. PCT/IL2012/050305 to the applicant of the present application, which is incorporated in its entirety herein by reference. Additionally, other types of handles movable about an axis of rotation pass that through the handle may be used.

Embodiments of the present invention provide a mechanical system for non-linear conversion of the rotational movements of a handle to linear movements of an operated device, for example, of a movable plate of a cartridge of a faucet. For example, the magnitude of movement of the handle required to achieve a certain magnitude of linear movement of the operated device changes as a value of parameter related to the operated device changes. For example, the magnitude of movement of the handle required to achieve a certain magnitude of linear movement of a movable plate of a cartridge of a faucet may increase as the flow rate of water flowing through the faucet decreases, so that the changes of the controlled parameter are smaller when the handle is operated close to the 'closed' position and larger when the handle is operated close to the 'fully opened' position, for the same magnitude of movement of the handle.

According to embodiments of the present invention, the mechanical system may include a handle, and a movement transformation assembly to transform movements of the handle to movements of the movable plate. The handle is rotatable about an axis of rotation perpendicular to the handle and to the movement transformation assembly. The movement transformation assembly may include a fixed rod pivoted to the handle and fixed to the cartridge and a movable rod pivoted to the handle at a distance from the pivoting point of the fixed rod. The movable rod may be pivoted to a rocker at the second end of the movable rod and may rotate the rocker that may move the movable plate.

Figure 4:
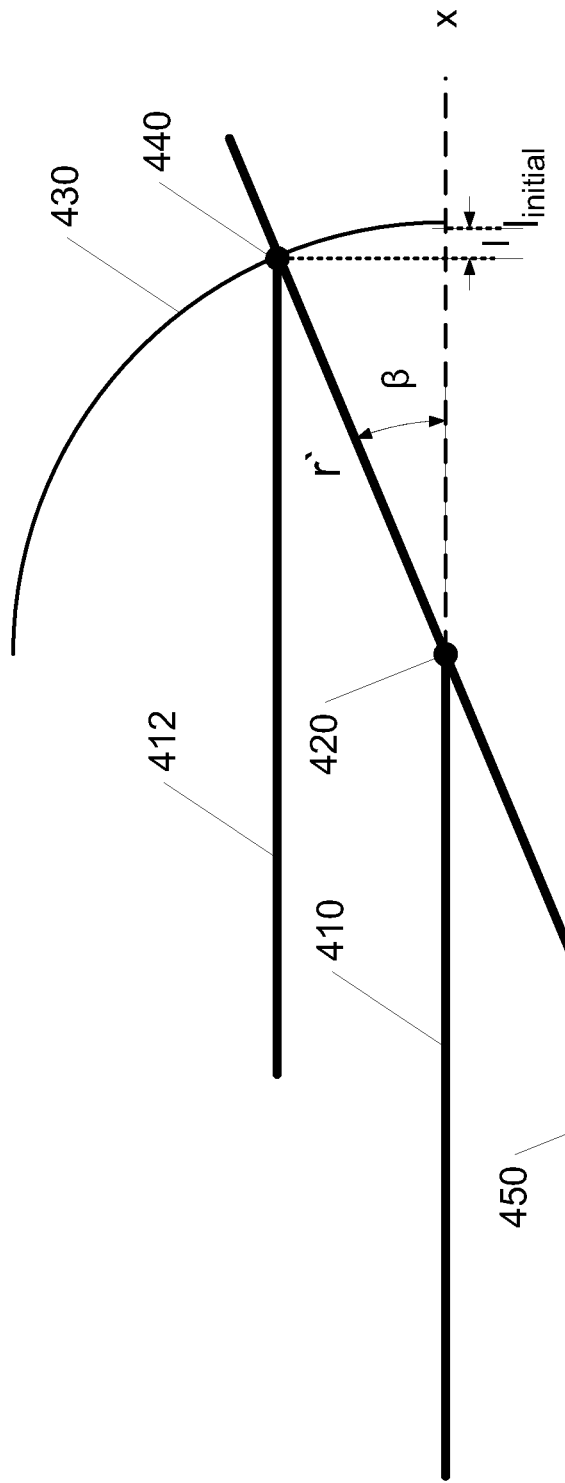
FIG. 4 is a schematic bar diagram representing a handle and a movement transformation assembly according to embodiments of the present invention.

Reference is now made to FIG. 4 which is a schematic diagram representing a handle and a movement transformation assembly according to embodiments of the present invention, depicted in relation to x-axis. Line 410 represents a fixed rod, pivoted to the handle represented by line 450 at pivoting point 420 and line 412 represents a movable rod pivoted to the handle at pivoting point 440. Handle 450 and line 412 are depicted in nearly closed position. Handle 450 is rotatable about an axis of rotation that passes through handle 450 at pivoting point 420, and is perpendicular to handle 450 and to bar 410. When handle 450 is rotated about pivoting point 420, pivoting point 440 moves in circular movement around pivoting point 420, the movement is represented by arc 430. When handle 450 is rotated from an initial position by an angle β (beta) line 412 is shifted by $l = l_{initial} - r' \cos\beta$, where r' is the distance between pivoting point 420 and pivoting point 440, and $l_{initial}$ is the initial position of pivoting point 440 along the x axis (if the initial position is β=0 then $l_{initial} = r'$). Deriving by β yields $$\frac{dl}{d\beta} = r'\sin\beta.$$

In the range of 0≤β≤90 degrees, for small values of β the value of sin β is low comparing to larger values of β. Hence, a relatively large movement of handle 450 done at small values of β may result in a relatively small movement of line 412 along the x-axis in comparison to the same movement of handle 450 done at higher values β.

Figure 5C:
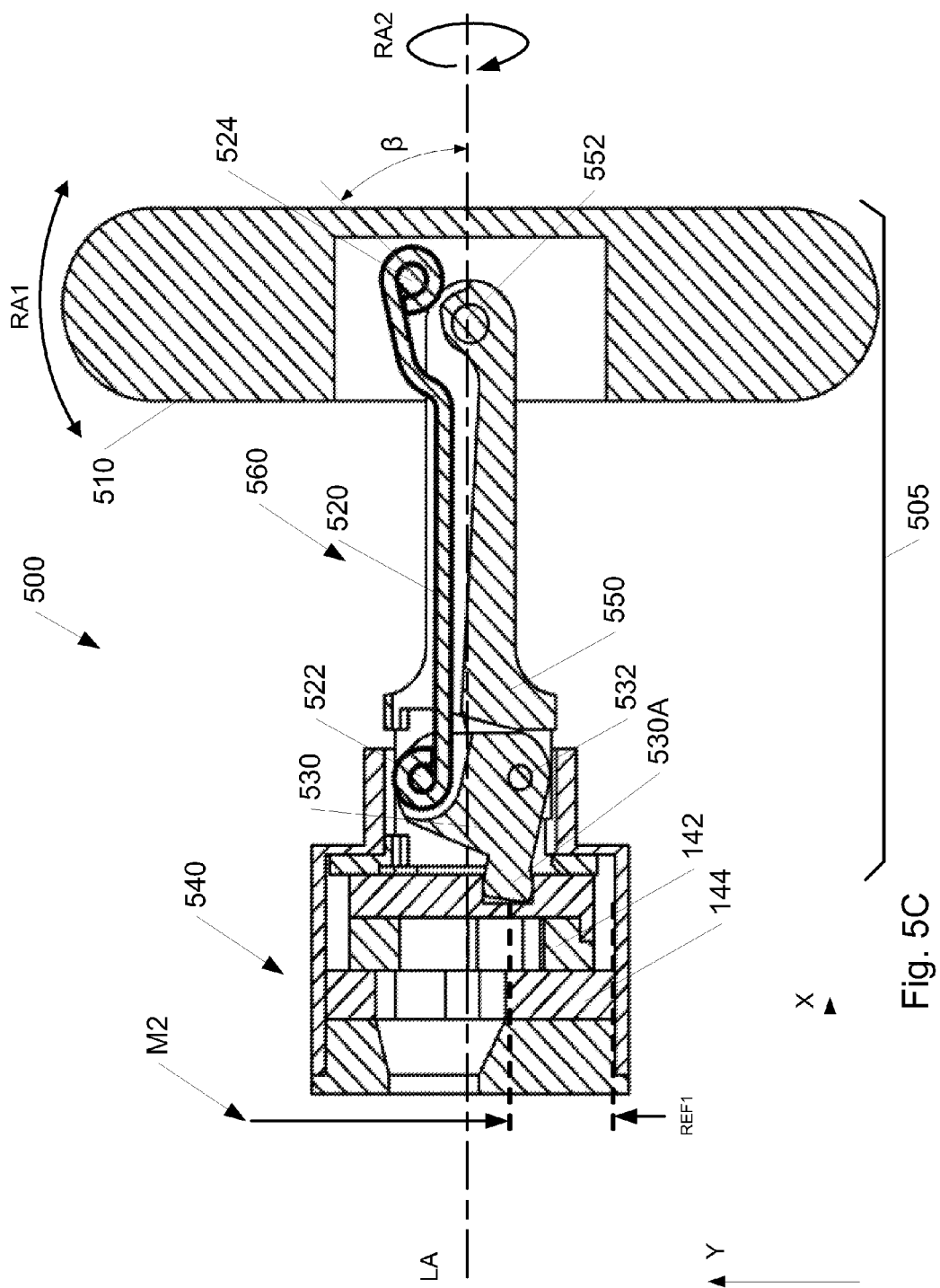

Reference is now made to FIG. 5A which is a schematic front view illustration of cartridge 540, and movement transformation assembly 560 and handle 510 of single lever mixer faucet 500 according to embodiments of the present invention, and to FIGS. 5B, 5C and 5D which are cross sectional side views of faucet 500, in closed, middle and fully opened positions, respectively, along section line II-II, marked on FIG. 5A. Movement transformation assembly 560 and handle 510 may constitute a mechanical system 505 for non-linear conversion of a first kind of rotational movements of handle 510 to linear movements of movable plate 142. Mechanical system 505 may provide at least two movement controls as depicted by arrows RA1 and RA2 in FIG. 5C. Arrow RA1 depicts a first rotational movement of handle 510 about axis 552 in a plane parallel to the drawing's page and RA2 depicts a second rotational movement about longitudinal axis LA. The first rotational movement and the second rotational movement of handle 510 may be substantially perpendicular to each other and independent of each other within certain movement limits.

Movement transformation assembly 560 may include a fixed rod 550 and a movable rod 520. Fixed rod 550 may be pivoted to handle 510 at pivoting axis 552 and fixed to cartridge 540. Movable rod 520 may be pivoted to handle 510 at pivoting axis 524 located at a distance of operational radius from pivoting axis 552 of the fixed rod. An imaginary longitudinal central line LA depicts the central line running along substantially the center of rod 550. Line LA is shown in FIGS. 5C and 5D and is not shown in FIG. 5B in order to not obscure the drawing. Handle 510 may rotate about axis 552 between first value of angle β associated with the closed position and a second value of angle β associated with the fully opened position of said faucet. Movable rod 520 may be pivotally connected to rocker 530 at pivoting axis 522 at the second end of movable rod 520 and may rotate rocker element 530 about pivot axis 532 that may linearly move movable plate 142 by means of jag 530A located at the circumference of rocker element 530. Handle 510 may rotate about pivoting axis 552 of fixed rod 550. Cartridge 540 may include movable plate 142, static plate 144 and rocker 530. Rocker 530 may be adapted to be tilted by movable rod 520. The linear movement of movable plate 142 is directly dictated by the tangential component of the angular movement of jag 530A that is parallel to the direction of movement of movable plate 142.

The position, or distance along a line parallel to the surface of moveable plate 142, of jag 530A with respect to reference line REF1 is depicted by M1 in FIG. 5B, by M2 in FIG. 5C and by M3. Accordingly the linear movement of jag 530A and moveable plate 142 is derived from the difference between M1 and M2 between the locations M1 and M3. In the closed position depicted in FIG. 5B, the value of angle β is low, in the middle position depicted in FIG. 5C the value of angle β is larger. Angle β increases even more in the fully opened position. Thus, rotation of handle 510 at a certain angle magnitude in the middle position will result in smaller movement of movable plate 142 in comparison to the same magnitude of rotation performed close to the opened position. The movement of movable plate 142 will be even smaller if the same magnitude of rotation is performed close to the closed position.

It should be noted that the calculation performed hereinabove are only close approximations of the movements of movable rod 520. The real movement pattern of movable rod 520 may be more complex and the shift of movable rod 520 along the x-axis may slightly differ from what presented for rod 412 by involving also movement along the Y axis because movable rod 520 is pivotally connected to handle 510 and to rocker 530.

Figure 6:
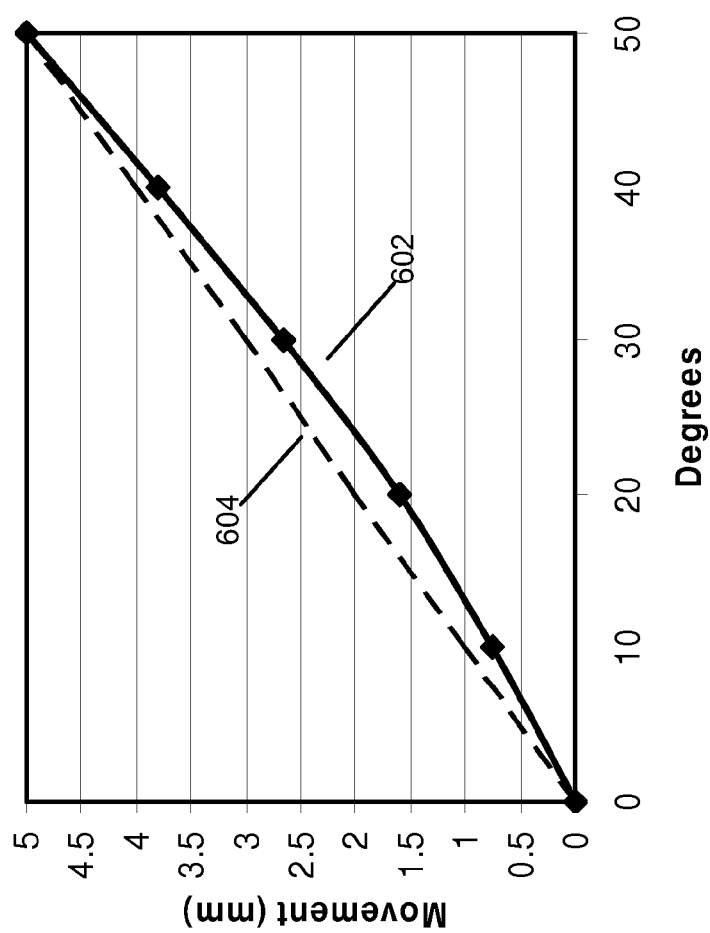
FIG. 6 presents a graph relating movement of a movable plate and an angle of rotation of the handle of an exemplary faucet comprising mechanical system for non-linear conversion the rotational movements of handle to linear movements of movable plate according to embodiments of the present invention.

Reference is now made to FIG. 6 which is a graph depicting the relation between the movement of movable plate 142 (FIGS. 5B, 5C and 5D) presented along the Y axis and the change of angle of rotation β of the handle of an exemplary faucet comprising mechanical system for non-linear conversion of the rotational movements of handle 510 presented along the X axis according to embodiments of the present invention. It is apparent that the relation, depicted by the thick continuous line 602, is non-linear (the linear relation is depicted by dashed line 604). For example, it can be seen that moving the handle from 0 degrees to 10 degrees, a 10-degrees movement, results in 0.75 mm of movement of the movable plate, while moving the handle from 40 to 50 degrees, which is also a movement of 10 degrees, results in 1.2 mm of movement of the movable plate, which is 160% compared to the movement in the range of 0 degrees to 10 degrees. The specific rate of change is dependent on the specific design of the conversion system that may be modified as may be required to meet specific design requirements. Another way to demonstrate the effect of the non-linear transmission rate depicted in FIG. 6, is evaluating the derivative of the graph in FIG. 6 close to the 'fully closed' position, which is low, and the value of this derivative of the graph close to the 'fully opened' position, which is high.

Figure 1C:
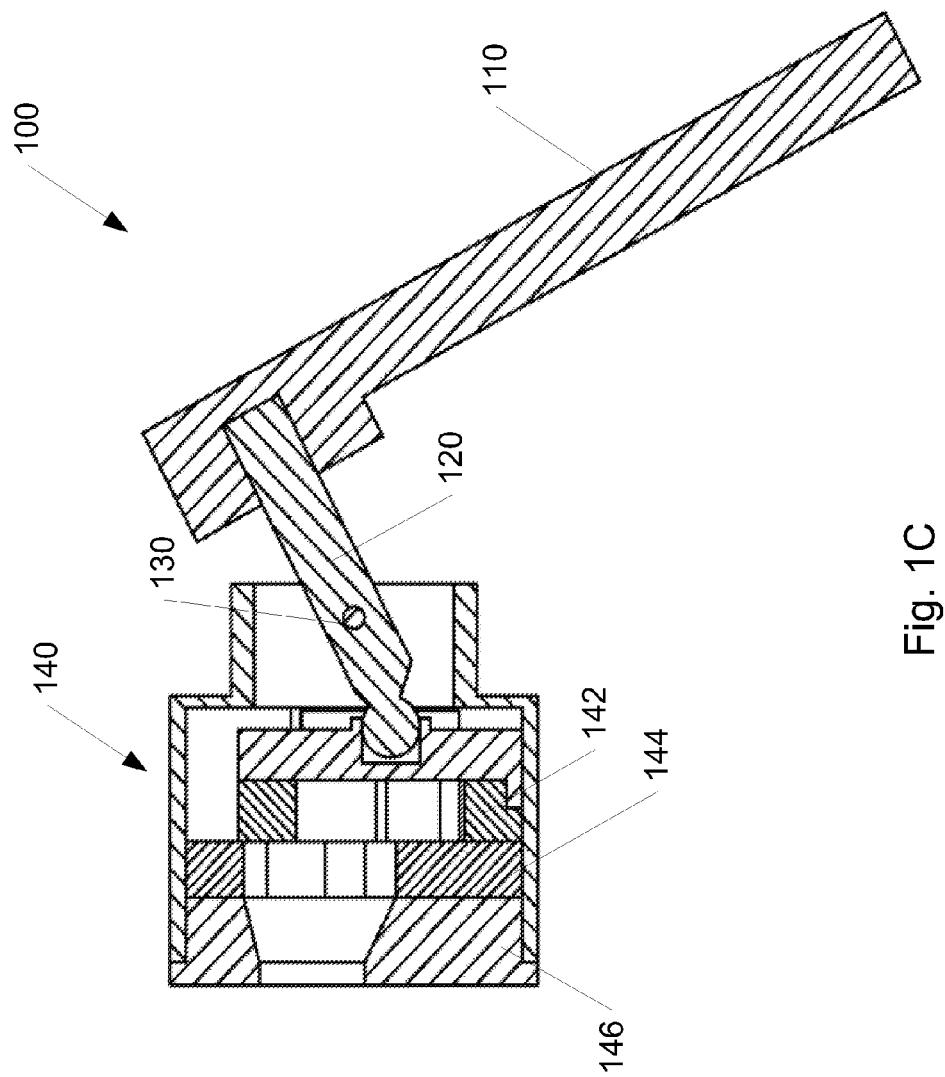
Figure 2:
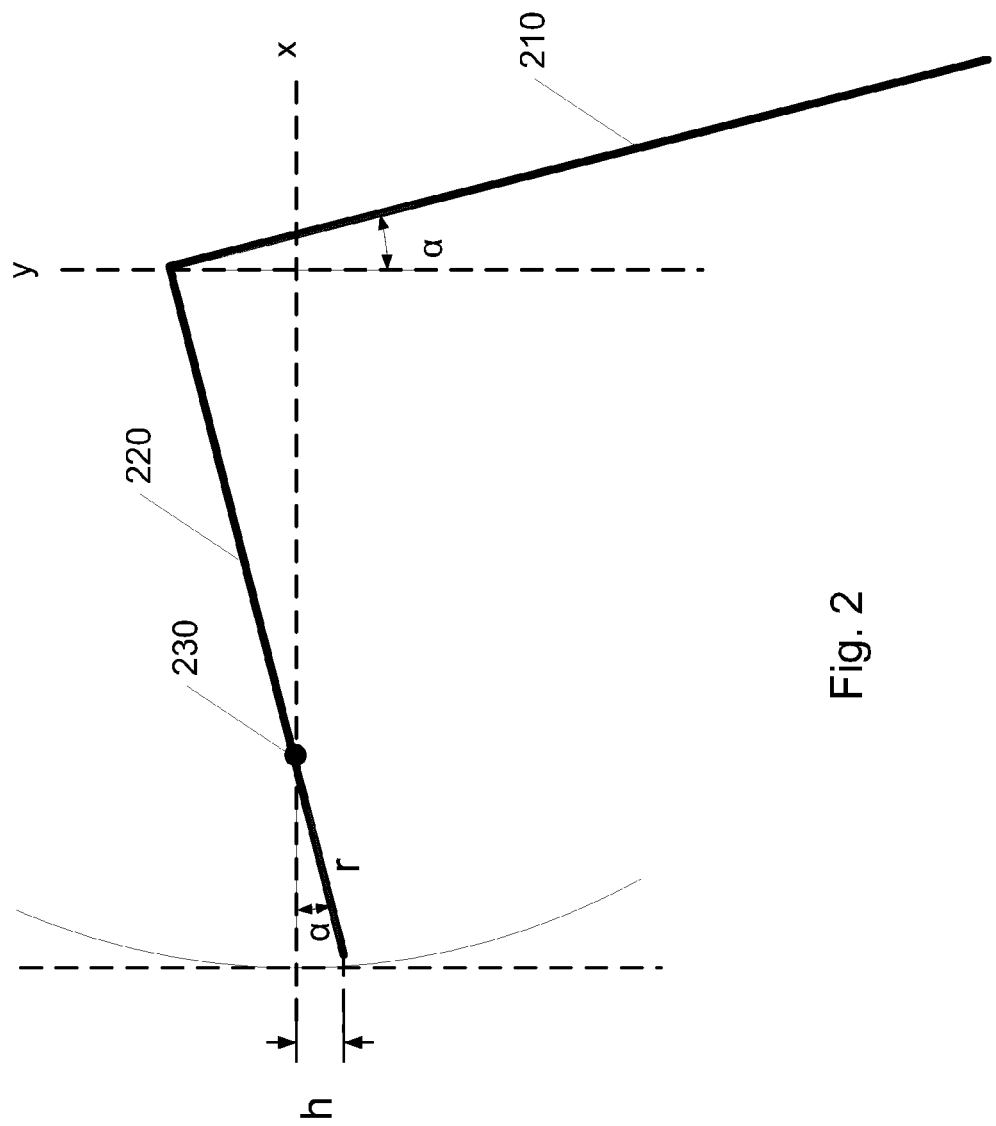
FIG. 2 is a schematic bar diagram representing a handle and a lever of a prior art faucet.
Figure 3:
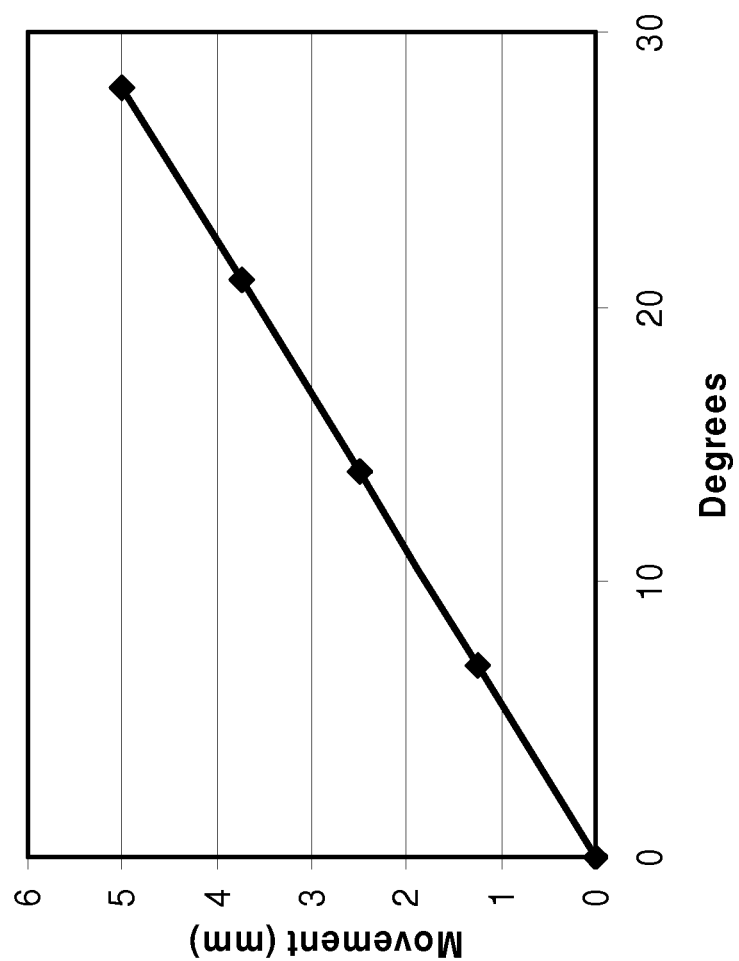
FIG. 3 presents a graph relating h and α of an exemplary prior art faucet.

When tested in the lab, the current design was detected as superior comparing to prior art faucets of different designs that uses cartridge and handle as described in FIGS. 1A 1B and 1C, by enabling better control of the flow rate of the water.

Nonlinear transmission rate between operating handle and flow rate of the water in faucets may be achieved by changing the design of the openings of the static and movable plates. However such changes are complicated, restricted by the physical dimensions of the cartridge and physical considerations related to the flow profile of the water, and to other considerations such as noise, ability to operate in areas in which the water pressure is low, etc.

Nonlinear transmission rate between operating handle and operated water flow regulation mechanism according to embodiments of the present invention may give the user a better and easier control of single lever mixer faucet cartridges in comparison to prior art single lever faucets, by enabling the user to perform more delicate and precise adjustments to the water flow rate in the low flow rates, than is possible with handles that are common today.

Nonlinear transmission rate between operating handle and operated water flow regulating mechanism according to embodiments of the present invention were described herein mainly with relation to a mechanical control handle and mechanical movement transformation assembly that can manipulate and influence flow rate of water in faucets. Nonlinear transmission rate between operating handle and operated water flow regulating mechanism according to embodiments of the present invention are not limited to faucets and control thereof and may be utilized to operate any device in which nonlinear transmission rate between operating handle and operated mechanism is required. Other possible applications may include other mechanical systems such as mechanical brakes of bicycle or other vehicle, opening and closing pressure valves in pneumatic systems, etc.

According to embodiments of the present invention there is provided a low profile diversion plate or disk for diverting flow of a material such as fluid between a first device that includes first supply openings and a second device that includes second supply openings, each of the second supply opening corresponding to an opening in the first device, wherein the supply openings of the first device are not located opposite their corresponding supply opening in the second device. According to embodiments of the present invention, supply openings of the first device may even be located against and at least partially overlap a not corresponding opening of the second device. The diversion plate may include a first set of openings located on a first facet of the plate, each of the openings located on the first facet corresponding to one of the supply openings of the first device and extending, in the plane of said first facet, beyond the corresponding supply opening. The diversion plate may also include a second set of openings located on a second facet of the plate, each corresponding to one opening of the supply openings of the second device and to one of the first set of openings of the diversion plate. Each one of the second set of openings may be shifted with respect to its matching first opening related to an imaginary line passing through said first opening and perpendicular to said first facet. According to embodiments of the present invention each of said second openings may be located to at least partially overlap the projection of a non-matching first opening. A passage may be formed from each one of said first openings to its matching second opening through said diversion plate to enable flow of fluid between said matching openings. The plate may include partitions extending between the first facet and the second facet of the plate, at areas in which supply openings of the first device are located against a non-corresponding fluid supply opening of the second device, and wherein the partitions constitute part of walls of the passages.

The plate may be manufactured as an assembly of a plurality of thinner plates, each diverting the flow to some extent, or as a single part, using, for example, 3D printing.

According to embodiments of the present invention, the diversion plate may be in the form of a disk that may be placed in a cartridge of a faucet to enable a rotational shift of the water supply openings of the cartridge with respect to the location of the water supply openings of the faucet. For example, a diverting disk according to embodiments of the present invention may enable rotation of the location of the water supply openings of the cartridge about the center of said disk with respect to the water supply openings of the faucet, for example by about 90° (degrees). Since the diversion disk has low profile, or thickness, it may be fitted into standard faucets and cartridges, for example by replacing the standard base plate cartridge of the standard faucet and possibly adding an additional plate with substantially no other adjustments.

In the detailed description hereinbelow an example of the design concept of a diversion disk for faucets according to embodiments of the present invention will be given. It should be noted however that embodiments of the present invention are not limited to this specific example. For example, the openings may be shifted in a pattern other than rotation, or rotated in an angle other than 90° with respect to each other. Additionally, same design concepts may be utilized for designing diversion plates of application other than faucets.

Reference is now made to FIG. 7 which is an exploded view of a cartridge housing 720 and a cartridge 710 rotated by about 90° with respect to cartridge housing 720 about a longitudinal axis A-A in the direction indicated by arrow B. Housing 720 may include supply openings 722, 724 and 726. For example, supply openings 722 and 724 may form water inlets for cold and hot water while supply opening 726 may form mixed water outlet. Cartridge 710 may include supply openings 712, 714 and 716. For example, supply openings 712 and 714 may form water inlets for cold and hot water while supply opening 716 may form mixed water outlet. Opening 722 may correspond to opening 712, opening 724 may correspond to opening 714 and opening 726 may correspond to opening 716. When cartridge 710 is not rotated with respect to cartridge housing 720 corresponding openings are placed against each other such that substantially straight passages for water are formed between respective pairs of openings. However, in the rotated position corresponding openings are not placed against each other, and even worse, an opening of housing 720 may be placed substantially against, or may partially overlap, or be placed opposite to a non-corresponding opening. The term 'overlap' here may represent a placement of one opening at least partially overlapping the projection of another opening as seen in a view taken parallel to the longitudinal axis of the respective elements. For example, the longitudinal axis of cartridge 710 and housing 720 is axis 711 in FIG. 7. Cartridge 710 may include pins 718 that fit corresponding recesses in housing 720 (not shown). Pins 718 may be used for locating cartridge 710 in a desired orientation with respect to housing 720.

Reference is now made to FIG. 8 which is a schematic illustration of the location of openings 712, 714 and 716 of cartridge 710 (thin lines) as placed against openings 722, 724 and 726 (thick lines) of housing 720. Point marked "A" in FIG. 8 represents the location of the common longitudinal axis 711 (FIG. 7). As can be clearly seen opening 724 is not placed against/opposite corresponding opening 714 and substantially overlaps non-corresponding opening 712; opening 726 partially overlaps corresponding opening 716 but also non-corresponding opening 714, etc. The amount of angular rotation of the openings 712, 714 and 716 of cartridge 710 with respect to their respective openings 722, 724 and 726 of housing 720 is represented by arrow "B" extending from the center of opening 726 to the center of opening 716.

Reference is now made to FIGS. 9A, 9B, 9C and 9D which are schematic illustrations of diversion plates 950, 960, 970 and 980, respectively, adapted to divert flow of fluids from one opening to another opening which are placed rotated by 90 degrees with respect to the first opening, according to embodiments of the present invention. The representation of diversion plates 950, 960, 970 and 980 and their respective devices 951 and 952 are drawn as a cross section done along cutting circle line 812 (FIG. 8) performed through first device 951, diversion plates 950, 960, 970 and 980 and second device 952 and then the roundly cut was schematically straightened, for improved clarity of the description. Device 951 includes supply openings 963, 964 and 965 that correspond to supply openings 953, 954 and 955 of second device 952, respectively. As can be seen, each one of supply openings 963, 964 and 965 of first device 951 is not located opposite its corresponding supply openings 953, 954 and 955 respectively of second device 952, but rather opposite a non-corresponding opening. In the example shown the number of supply opening is three however embodiments of the present invention may include any number of supply openings as may be required. Any type or fluid and/or quasi-fluid (such as powder, small grains, etc.) may flow in or out of supply openings 953, 954, 955, 963, 964 and 965 as may be required. Passages 63, 64 and 65 are formed inside diversion plate 950 between corresponding openings 963 and 953, 964 and 954, and 965 and 955, respectively. Diversion plate 950 may include a first set of openings 863, 864 and 865 located on a first facet 860 of plate 950, each corresponding to one of the supply openings 963, 964 and 965 of device 951 and extending, in the plane of facet 860, beyond the corresponding supply opening. Diversion plate 950 may include a second set of openings 853, 854 and 855 located on a second facet 850 of plate 950, each corresponding to one of supply openings 953, 954 and 955 of device 952 and to one of the openings 853, 854 and 855. Each one of openings 853, 854 and 855 may extend, in the plane of facet 850, beyond the corresponding fluid supply opening of device 952 to at least partially match the corresponding one of openings 863, 864 and 865 to form passages 63, 64 and 65 for fluid flow, respectively. Plate 950 may include partitions 958, 956 and 957 extending between facet 850 and facet 860 of plate 950, at areas in which supply openings of device 951 are located against a non-corresponding water supply opening of device 952. Partitions 958, 956 and 957 constitute part of walls of passages 63, 64 and 65, respectively. Other walls of passages 63, 64 and 65 are formed by the respective portions of facets 850, 860 as is seen in FIG. 9A.

Diversion plate 960 shown in FIG. 9B is similar to diversion plate 950 except that openings 863, 864 and 865 extend beyond the corresponding supply opening in an inner plane of plate 960. In addition, each one of openings 963, 964 and 965 is shifted (to the right in FIG. 9B) further away from its corresponding opening of device 952. Therefore, Partitions 958, 956 and 957 are made longer with respect to the partitions of plate 950. Diversion plate 970 shown in FIG. 9C is similar to diversion plate 950 except that the thickness of plate 970, marked as h1 is decreased with respect the thickness of plate 950. Thickness of diversion plate 970 may be decreased by decreasing the height of side walls 973, 974, 975, 976, 977 and 978. While the thickness of diversion plate is decreased sufficient free passage in each of passages 970A, 970B and 970C should be maintained to ensure sufficient flow through them. In FIG. 9D, two diversion plates 981 and 982 are cascaded to increase the diversion shift distance of diversion assembly 980.

Figure 10B:
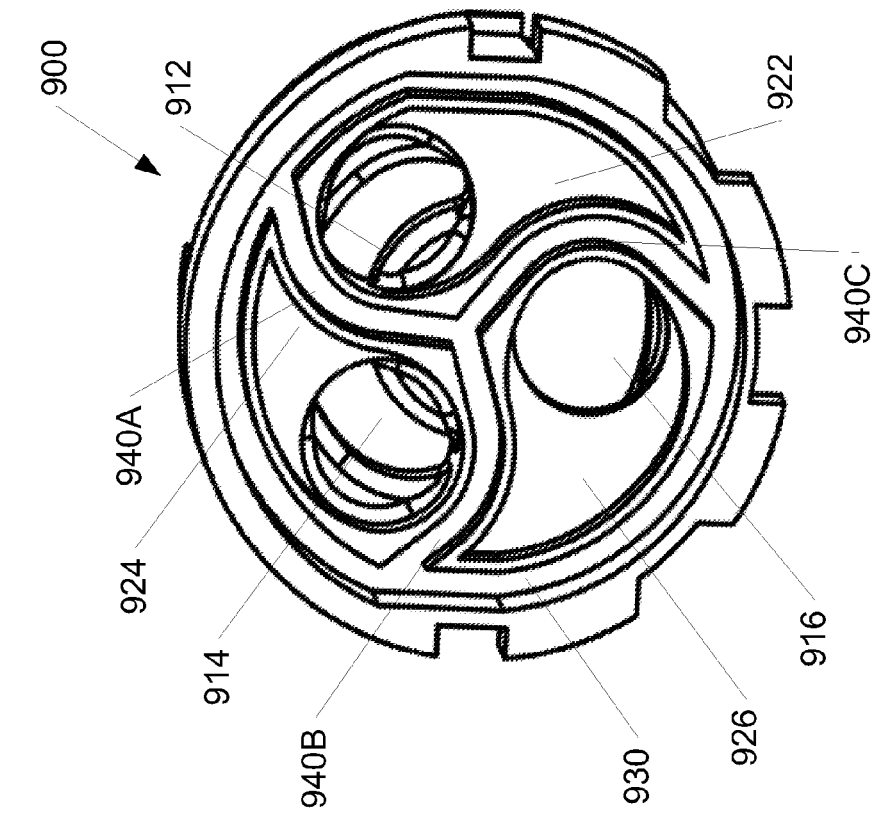
FIGS. 10A and 10B are schematic isometric rear and front views, respectively, of a modified base plate according to embodiments of the present invention.
Figure 10A:
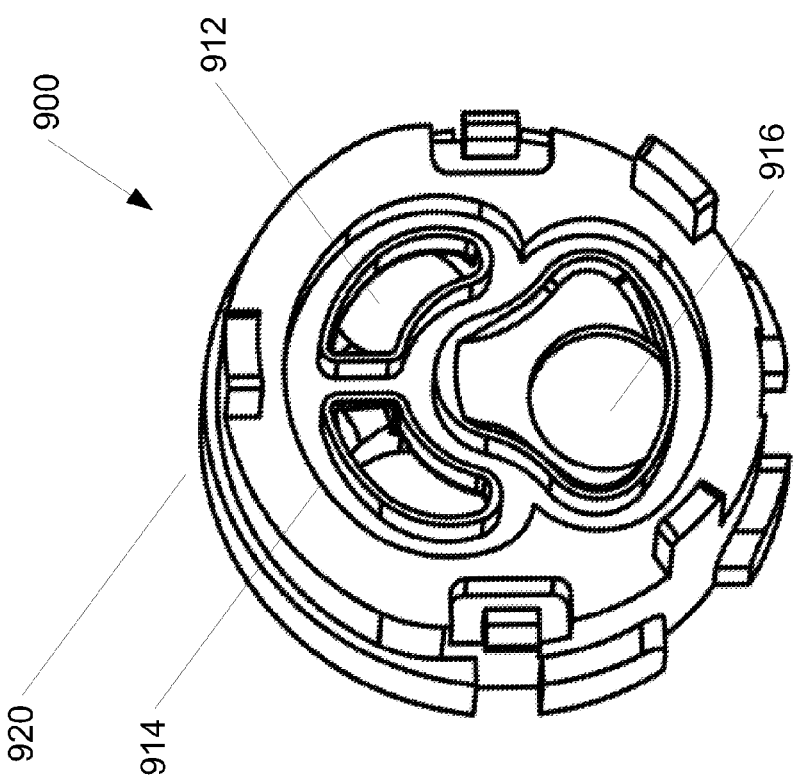

Reference is now made to FIGS. 10A and 10B which are schematic isometric rear and front views, respectively, of a modified base plate 900 according to embodiments of the present invention. At a rear facet 920 of modified base plate 900 openings 912, 914 and 916 fit (i.e. located at the same location as and adapted to connect to the same openings as) corresponding openings of a standard static plate, such as static plate 144. However at the front facet 930 of modified base plate 900 openings 912, 914 and 916 extend/spread beyond the corresponding openings of static plate 144 to form passages 922, 924 and 926, respectively. Passages 922, 924 and 926 are separated from each other by partitions 940A, 940B and 940C. The extensions are made as large as possible to consume as much as space as is available in modified base plate 900 and to extend over as large area as possible over the face of facet 930 without extending over a non-respective opening, while leaving space required for partitions 940 and gaskets, as may be required.

Figure 11:
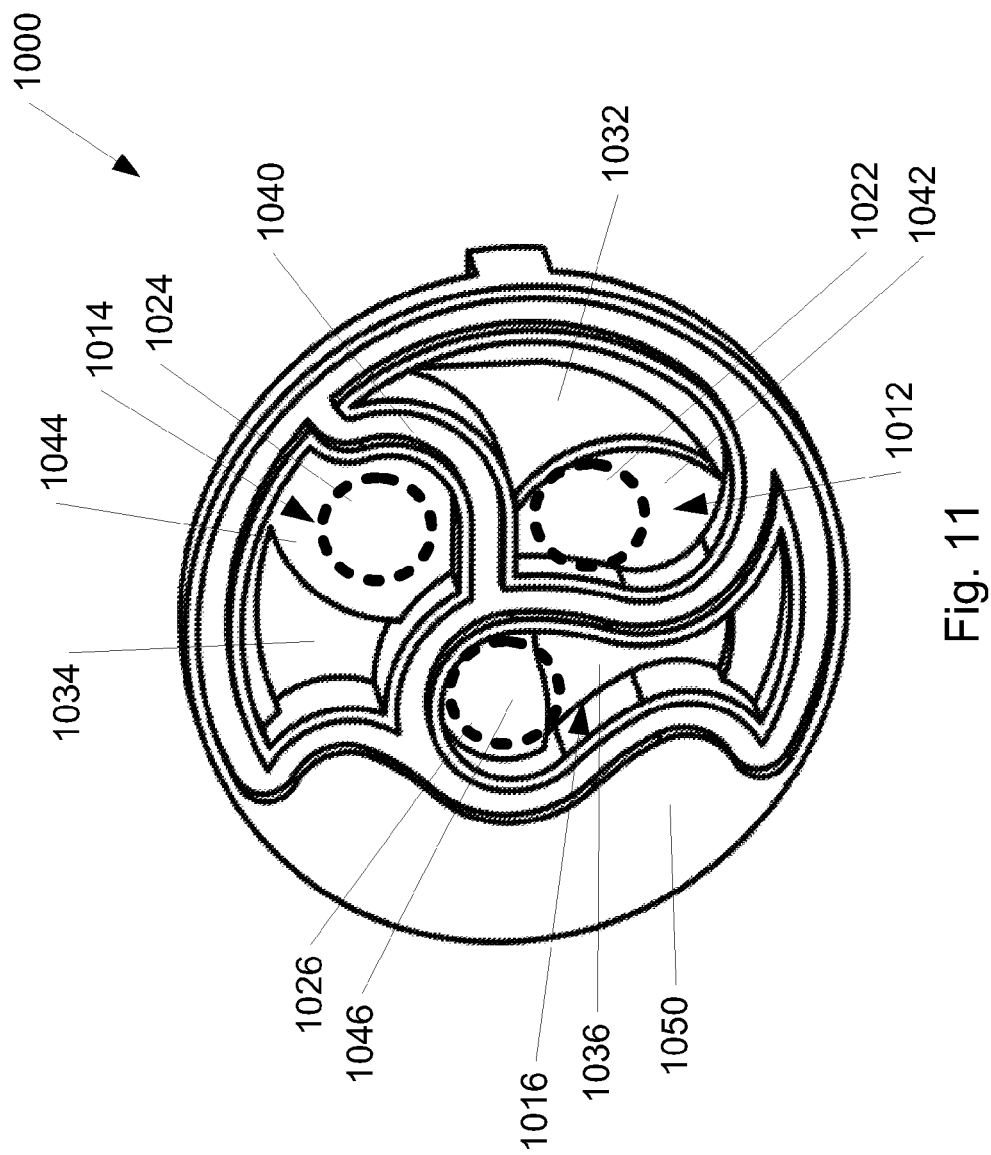
FIG. 11 is schematic illustration of an additional plate according to embodiments of the present invention

Reference is now made to FIG. 11 which is schematic illustration of an additional plate 1000 according to embodiments of the present invention. At a front facet of additional plate 1000 openings 1012, 1014 and 1016 fit corresponding openings of a standard faucet, such as faucet 100, at areas 1022, 1024 and 1026, respectively (marked as dashed circles). Openings 1012, 1014 and 1016 extend beyond the corresponding openings of faucet 100 to form passages 1032, 1034 and 1036, respectively. Passages 1032, 1034 and 1036 are separated from each other by partitions 1040. The extensions are made as big as possible to consume as much as space as is available in additional plate 1000, while leaving space required for partitions 1040 and gaskets, as may be required. At an inner plane of additional plate 1000, or at a rear facet of additional plate 1000 partitions 1042, 1044 and 1046 are formed at passages 1032, 1034 and 1036 at areas in which water supply openings of faucet 100 are located against a non-corresponding water supply opening of static plate 144 of the cartridge of faucet 100. Partitions 1042, 1044 and 1046 constitute part of walls of passages 1032, 1034 and 1036.

Figure 12:
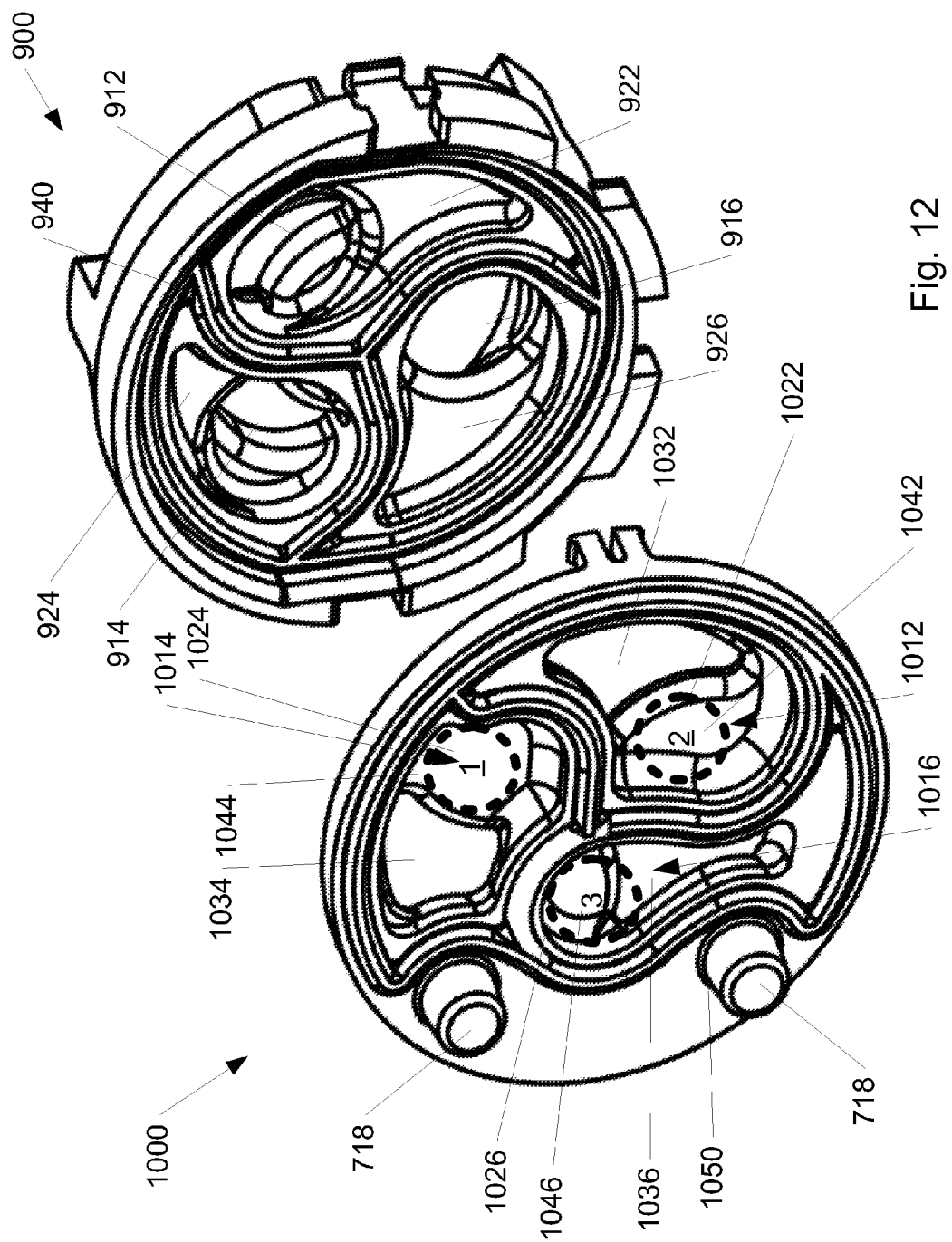
FIGS. 12, 13 and 14 are schematic illustrations of exploded isometric views of the modified base plate of FIGS. 10A and 10B and additional plate of FIG. 11 according to embodiments of the present invention.
Figure 13:
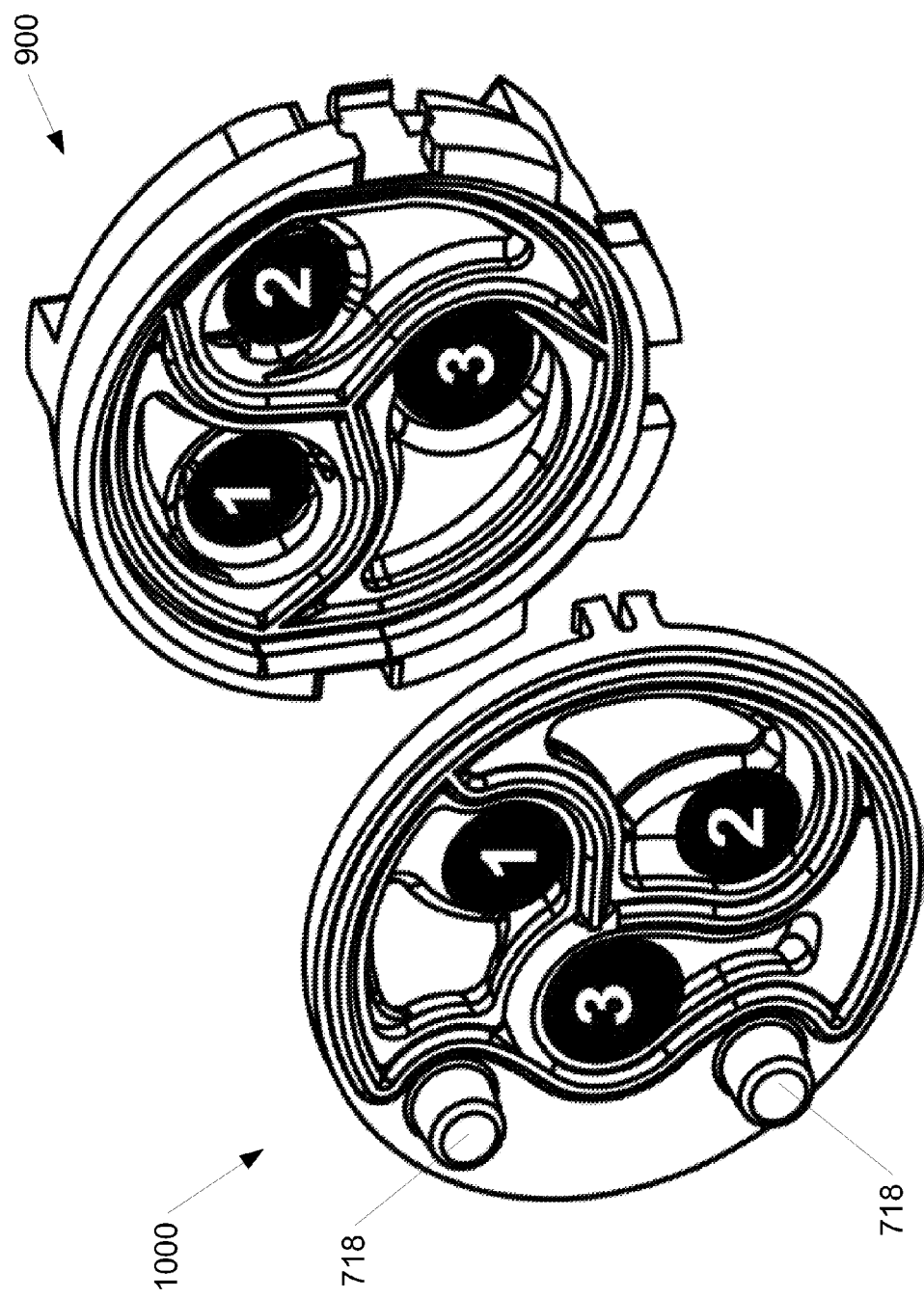
Figure 14:
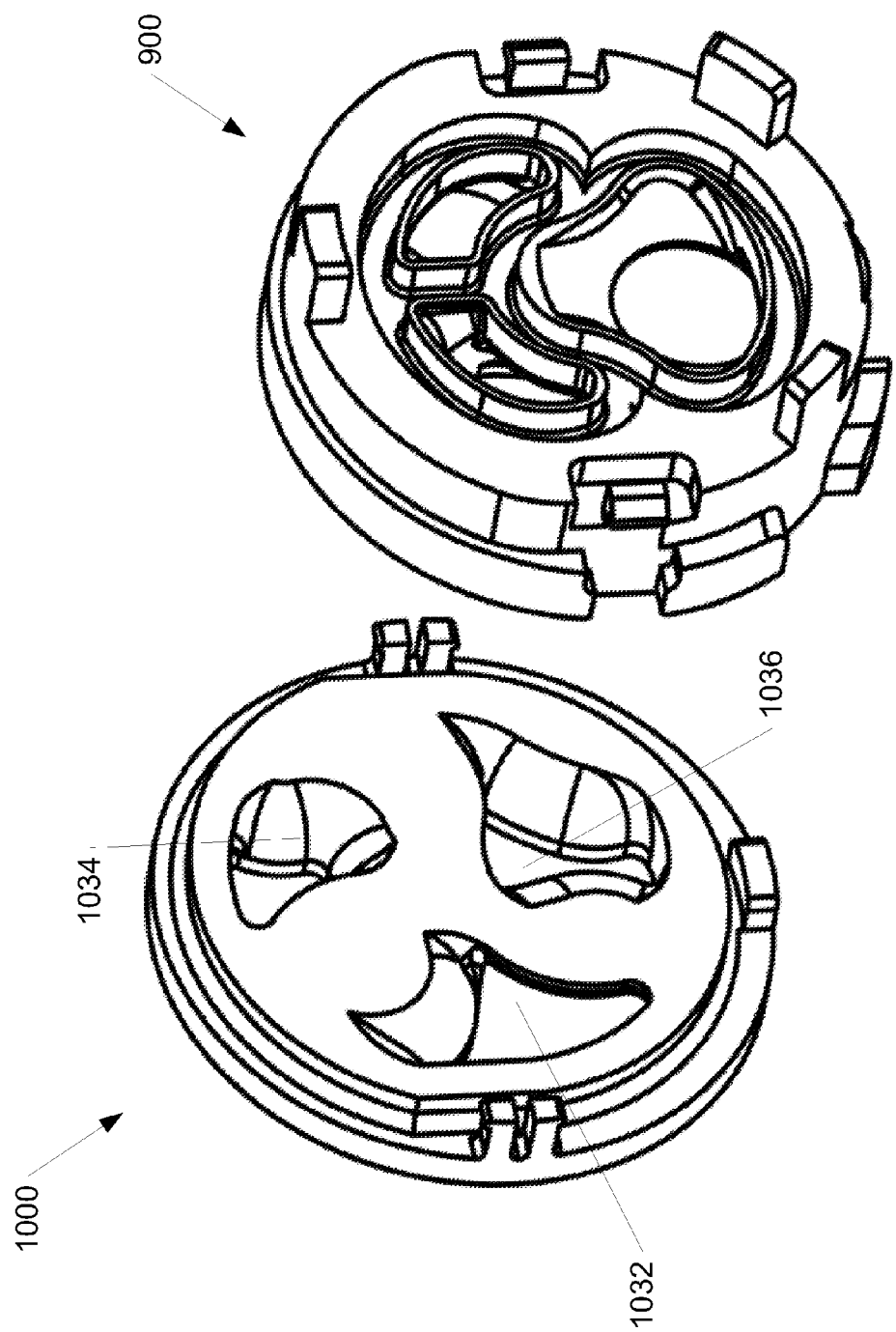

Reference is now made to FIGS. 12, 13 and 14 which are schematic illustrations of exploded isometric views of modified base plate 900 and additional plate 1000 according to embodiments of the present invention. As can be seen in FIG. 12, when modified base plate 900 and additional plate 1000 are assembled, each one of passages 1032, 1034 and 1036 of additional plate 1000 at least partially match or overlap corresponding one of openings 912, 914 and 916, respectively, of base plate 900 such that passages 1, 2 and 3 are formed. In FIG. 13 passages 1, 2 and 3 are marked on base plate 900 as well, generally in the areas in which of passages 1032, 1034 and 1036 at least partially match or overlap corresponding one of openings 912, 914 and 916, respectively. Passages 1, 2 and 3 are marked on base plate 900 generally in the area of the corresponding water openings of static plate 144 and on additional plate 1000 generally in the area of the corresponding water openings of faucet 710 (FIG. 7) passages 1032, 1034 and 1036 are shown from a different angel. Pins 718 that fit corresponding recesses in housing 720 (shown in FIG. 7) consume some space of additional plate 1000 and hence openings 1012, 1014 and 1016 may not extend taken by pins 718.

Figure 15:
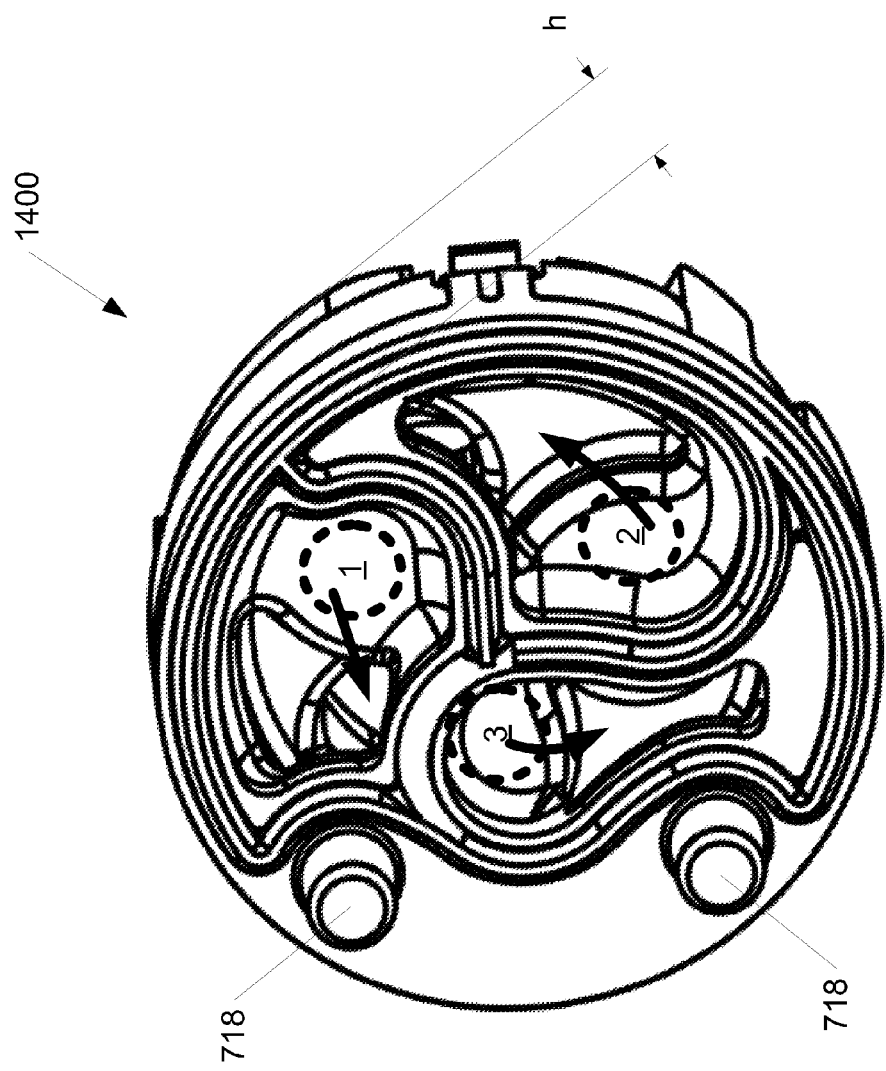
FIG. 15 is a schematic isometric view of an assembled diversion disk according to embodiments of the present invention.

Reference is now made to FIG. 15 which is a schematic illustration of isometric view of assembled diversion disk 1400 according to embodiments of the present invention. Diversion disk 1400 includes modified base plate 900 and additional plate 1000.

In the example presented hereinabove, diversion disk 1400 is assembled of two separate disks, modified base plate 900 and additional plate 1000. In some implementations of the above described embodiment the overall thickness of diversion disk 1400, marked as h, may be similar to the overall thickness of standard base plate 146 (shown in FIG. 1). In this case no other adjustments are needed to cartridge 100.

In some implementations of the above described embodiment, the overall thickness of diversion disk 1400, marked as h, may be greater than the thickness of standard base plate 146 (shown in FIG. 1). In this case, other elements of cartridge 100 may be made thinner, or cartridge 100 may be modified to be longer than the standard.

According to some embodiments of the present invention, the need to add additional plate may be eliminated if static plate 144 modified with respect to a standard static plate so as to divert the flow similarly to modified base plate 900, while keeping its overall standard thickness, and base plate 146 may change with respect to a standard base plate so as to divert the flow similarly to additional plate 1000, while keeping its overall standard thickness. In this case no other adjustments are needed to cartridge 100 in order to divert the direction of the streams of fluid through it.

Figure 16:
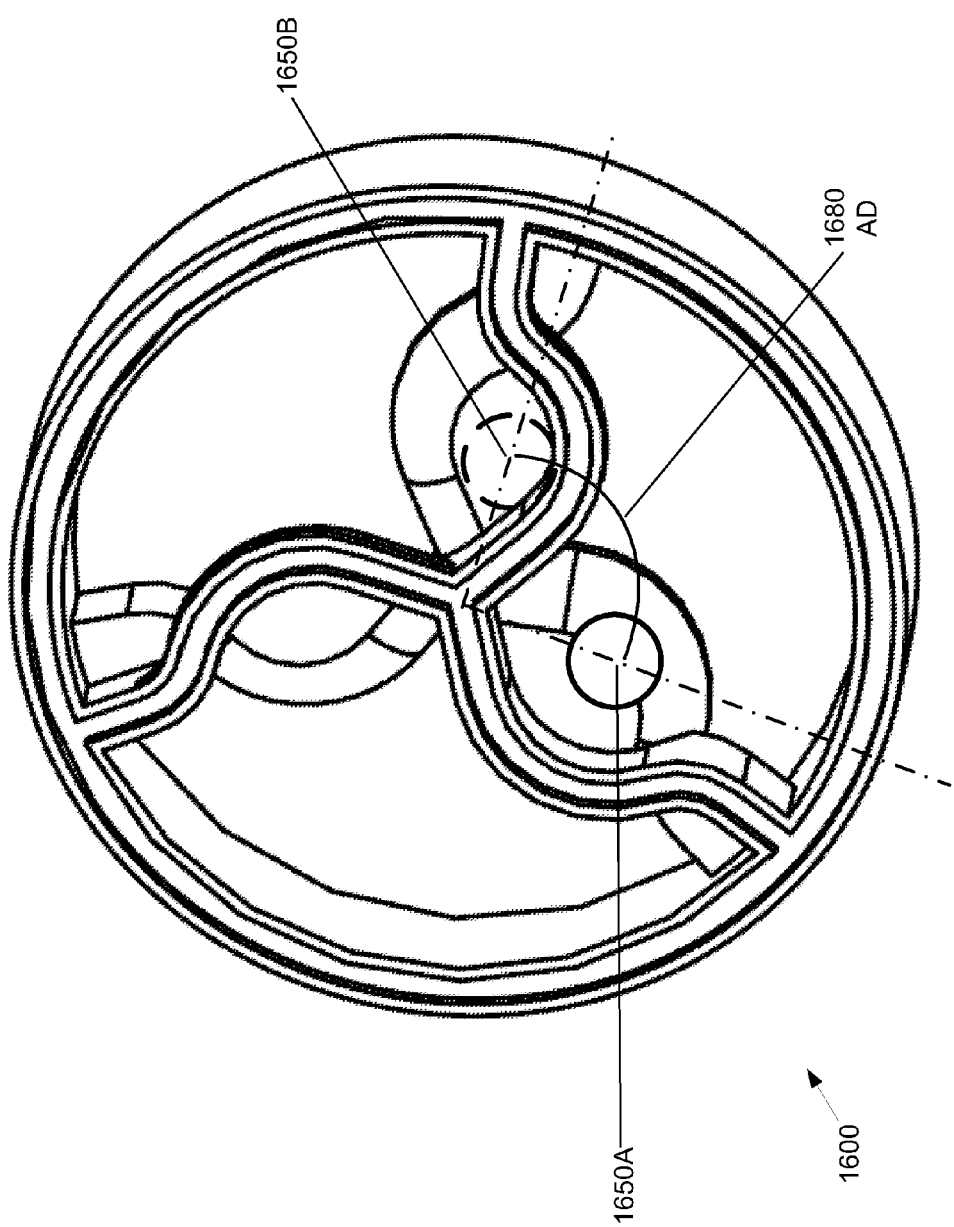
FIG. 16 schematically illustrates a diversion plate adapted to provide 90 degrees of rotational diversion according to additional embodiment of the present invention.

Reference is made now to FIG. 16 which schematically illustrates diversion plate 1600 adapted to provide 90 degrees of rotational diversion according to additional embodiment of the present invention. The construction and method of operation of diversion plate 1600 is equivalent to that of diversion plate 1700 explained below with respect to FIGS. 17 and 17A, with the necessary changes. Opening entry 1650A and its opening entry 1650B are diverted from each other by 90 degrees. The length of arc 1680 extending between the center of two respective openings, such as openings 1650A and 1650B is denoted AD.

Figure 17:
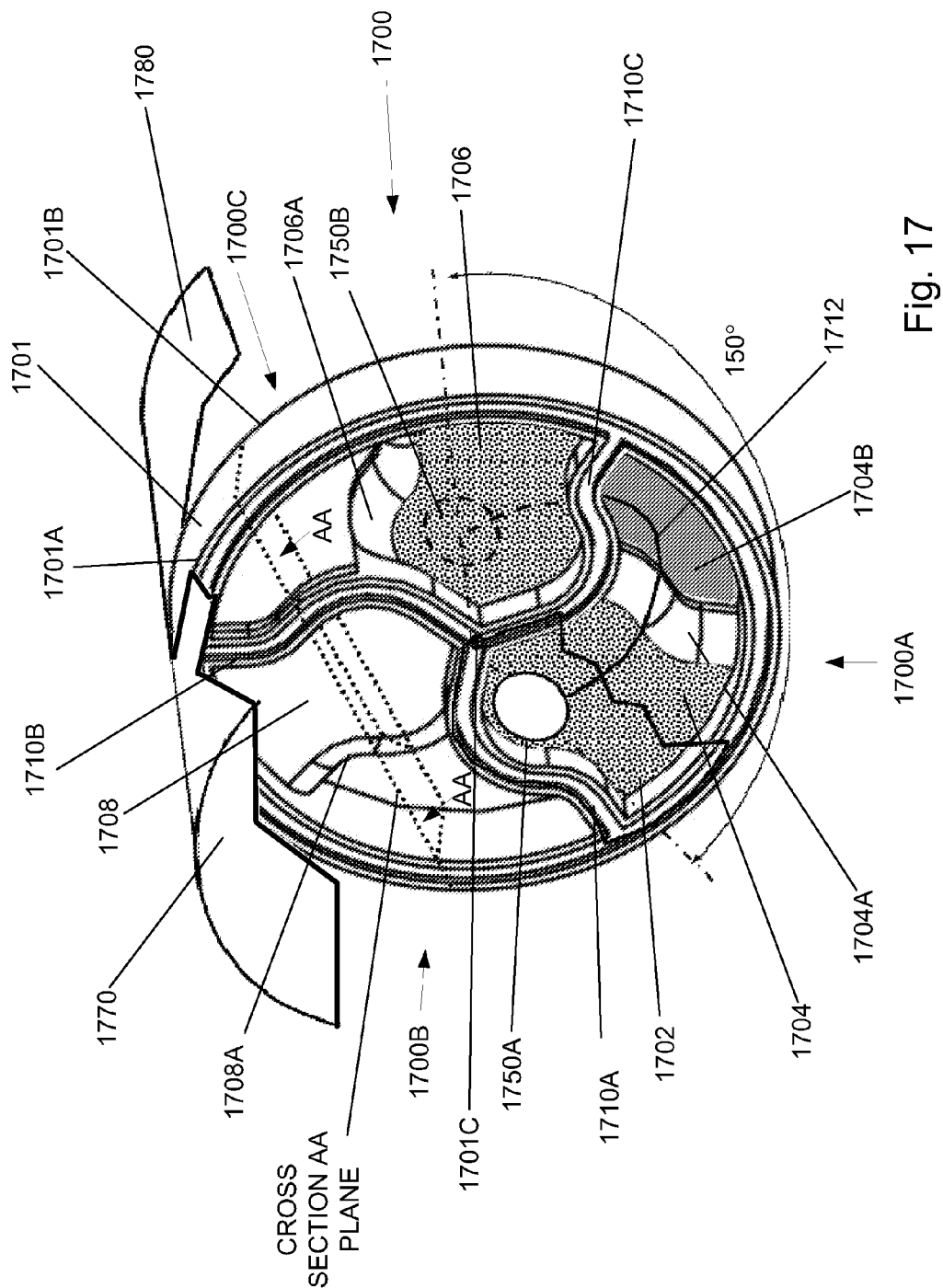
FIGS. 17 and 17A schematically illustrate a diversion plate adapted to provide 150 degrees of rotational diversion and a cross section AA through the diversion plate, respectively, according to additional embodiment of the present invention.
Figure 17A:
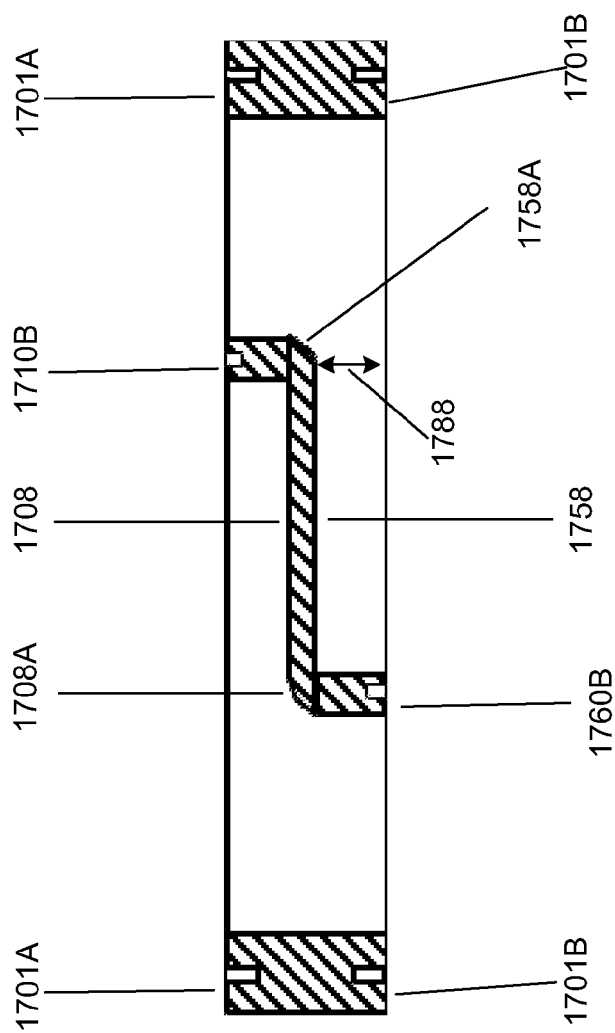

Reference is made now to FIGS. 17 and 17A which schematically illustrate diversion plate 1700 adapted to provide 150 degrees of rotational diversion and a cross section AA through diversion plate 1700, respectively, according to additional embodiment of the present invention. Plate 1700 may comprise outer ring 1701 having first circumferential edge 1701A encircling a first facet of plate 1700 facing the viewer of FIG. 17 and second circumferential edge 1701B encircling a second facet of plate 1700 facing away from the viewer of FIG. 17. Plate 1700 may be partitioned by several first group of partitions 1710A, 1710B and 1710C into sections 1700A, 1700B and 1700C and second group of first partitions 1760A, 1760B and 1760C (positioned behind and hidden by partitions flow edges 1704A, 1706A and 1708A in FIG. 17, respectively; only partition 1760B is shown in FIG. 17A), etc. First group of first partitions 1710A, 1710B and 1710C are provided extending between the inner side of ring 1701 towards central point 1701C and from the first facet 1701A of plate 1700 to second partitions 1704, 1706 and 1708, respectively, connecting said second partitions at their flow edges 1754A, 1756A and 1758A, respectively (only flow edge 1758A is seen in FIG. 17A) substantially perpendicular to said first and said second facets. Second group of first partitions, 1760A, 1760B and 1760C are provided extending between the inner side of ring 1701 towards central point 1701C and from the second facet 1701B of plate 1700 to second partitions 1704, 1706 and 1708, respectively, connecting said second partitions at their flow edges 1704A, 1706A and 1708A, respectively substantially perpendicular to said first and said second facets.

The number of first partitions in the first group and in the second group is identical, and will be determined by the number of inlet fluid inputs controlled, or diverted by plate 1700. In the example of FIG. 17 the number is three. Diversion plate 1700 may further be partitioned by several second partitions 1704, 1706 and 1708, etc. Second partitions 1704, 1706 and 1708 extending from one side of a respective first partition of the first group 1710A, 1710B and 1710C, towards an adjacent first partition of the second group, leaving space 1788 between its flow edge 1704A and the face of the device adjacent the facet farther from the respective first partition 1710B in the example of FIG. 17A, and between said central point 1701C and said inner side of ring 1701, substantially parallel to said first and said second facets of the plate and substantially in the midrange between them.

Plane 1702 exemplifies part of the face of a one device of a faucet cartridge, such as device 710 of FIG. 7. Plane 1704B exemplifies part of the face of another device of a faucet cartridge, such as device 720 of FIG. 7. Partial elements 1770 and 1780 exemplify outer circumference of devices 710 and 720 (FIG. 7). The edges of first partitions 1710A, 1710B and 1710C facing the viewer are made to firmly touch a face of device 1770, so that this face forms part of the chambers in which the diverted fluids flow. Circle 1750A symbolizes an opening of fluids in element 1770 and circle 1750B symbolizes the respective opening of fluids in element 1780. As seen in FIG. 17 the angular diversion between circle 1750A and 1750B is 150 degrees. Line 1712 symbolizes flow path from circle 1750A to circle 1750B. As seen, the flow path starts (or ends, as may be required) from circle 1750A and between partition 1710A, inner side of ring 1701 and partition 1710C and 1710B of first group of first partitions, and between face 1702 of element 1770 and the side of second partition 1704 facing the viewer, then under partition 1710B and between the side of second partition 1706 facing away from the viewer, the inner side of ring 1701, first partition 1760B of second group (not seen in FIG. 17 however similar partition 1760B of FIG. 17A), the face of device 1760 and central point 1701C. When the stream passes flow edge 1704A of partition 1704 it flows through space 1786 (not seen in FIGS. 17 and 17A but similar space 1788) to arrive between second partition 1706 and the face of element 1780 (not shown) towards circle 1750B and out of diversion plate 1700.

The way streams of the other two fluid inputs flow is similar to that of stream 1712, with the necessary changes. These flows are not drawn in order to not obscure the explanation of the flow of stream 1712.

Figure 18:
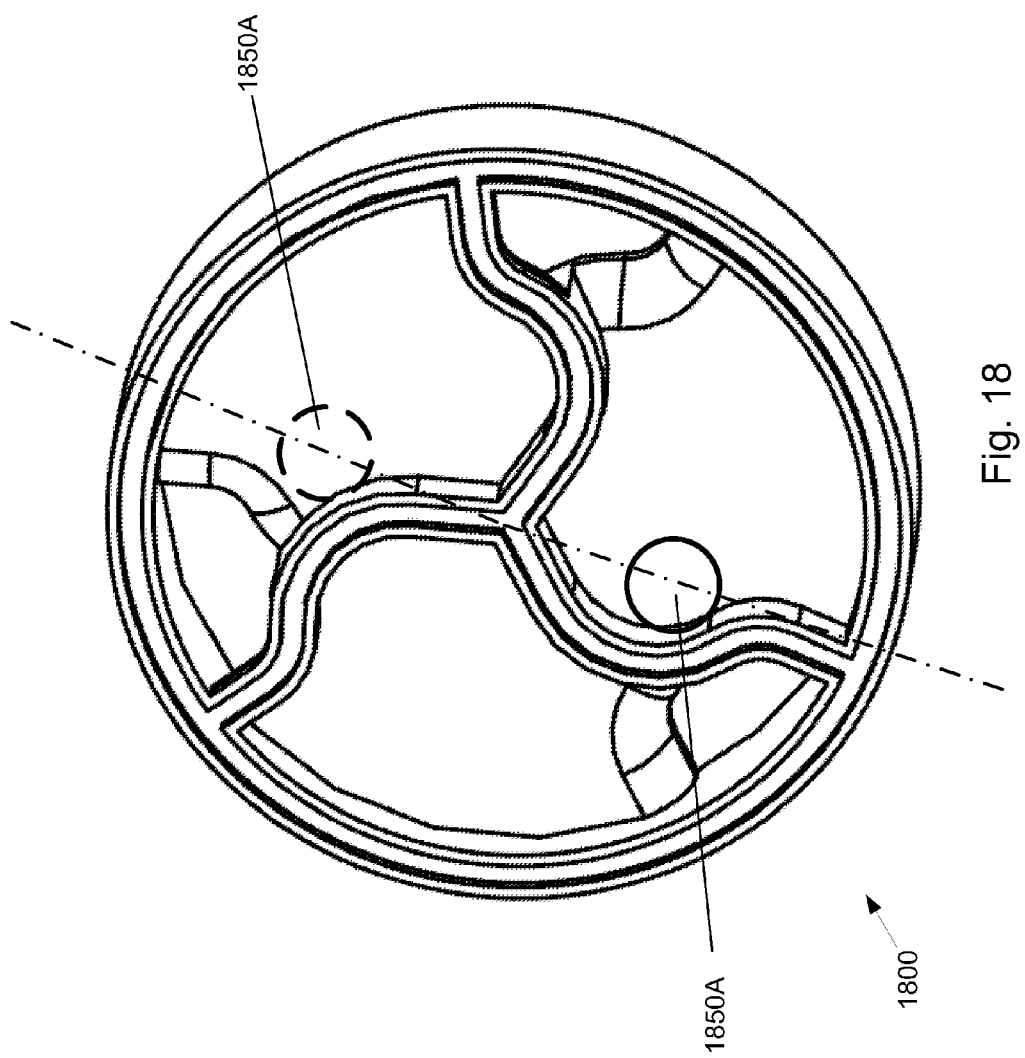
FIG. 18 schematically illustrates a diversion plate adapted to provide 180 degrees of rotational diversion according to additional embodiment of the present invention.

Reference is made now to FIG. 18 which schematically illustrates diversion plate 1800 adapted to provide 180 degrees of rotational diversion according to additional embodiment of the present invention. The construction and method of operation of diversion plate 1800 is equivalent to that of diversion FIG. 1700 explained below, with the necessary changes. Opening entry 1850A and its opening entry 1850B are diverted from each other by 180 degrees.

It will be appreciated by those skilled in the art that according to embodiments of the present invention any angular diversion between 0+ (zero+) and 180 degrees yet diversion between 30 and 180 degrees is a preferred range of diversion.

In a faucet cartridge commonly used today, the diameter of the base plate is 35 mm (millimeters) and the area of the base plate is approximately 961 $mm^2$. Each of the three openings has a diameter of 8 mm, hence the accumulated area of the three openings is approximately 150 $mm^2$ of the area of the base plate. Another area of about 500 $mm^2$ is used by gaskets and support structures for the gaskets. Therefore, the remaining area left for the diverting passages is approximately 311 $mm^2$. The thickness of the diversion disk or disks may be determined taking into account the mechanical properties of the material the diversion disk is made from and the liquid pressure. For example, for a standard home use, a diversion disk may be composed from two diversion plates, each having thickness of 2.5 mm, to allow thickness of 1 mm for the horizontal partitions (such as partitions 1042, 1044 and 1046 seen in FIG. 11) and 1.5 mm height for passages 1032, 1034 and 1036. According to this design, a 90 degrees rotational diversion of the fluid flow may be achieved by two diversion disks that have together the same thickness of a standard base plate, for example 5 mm. The minimal cross section area of the passages, as experienced by fluid flowing through the passages (i.e. as measured across the direction of flow in the narrower location along each passage), according to this design is about 30 mm$^2$ which is similar to the area of the openings of the example faucet—area that was proved to be enough for sustaining fluid flow rates of home faucets. Thus, in this example, a rotational diversion of the flow of fluid through diversion disk having total thickness of 5 mm may ensure that the opening at the face of the diversion disk having area of 50 mm$^2$ will have minimal cross section area of at least 40 mm$^2$ of its passage and preferably 50 mm$^2$. Thus, in this example, designed and produced according to embodiments of the present invention in diversion disk having disk diameter of 35 mm, disk thickness of 5 mm and rotational diverting of 90 degrees the ratio AR between the cross section area of the passage between two corresponding openings at its smallest value and the cross section area of a corresponding opening of the diversion disk is no less than AR=40/50=0.8 and preferably no less than 0.9 in a diversion disk having thickness to disk diameter ration TR no more than 5/35=~0.15. it will be emphasized that even with diversion plates of 150 and 180 degrees, as exemplified in FIGS. 17 and 18, the ration AR is kept between 0.8 and 1 for TR of no more than =~0.15.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A mechanical system for non-linear conversion of a rotational movement into a linear movement comprising:
    a fixed rod connectable at a first end to a cartridge assembly of a faucet having at least one operating lever for providing at least one separable movement control to said cartridge assembly;
    a handle rotatable in a first rotational movement about a first axis located at a second end of said fixed rod between a first angle of rotation associated with the closed position of said faucet and a second angle of rotation associated with the fully opened position of said faucet, adapted to provide first movement control by means of rotating said fixed rod about its longitudinal axis and second movement control by rotating said handle about said first axis;
    a rocker element rotatable about a second axis located at said first end of said fixed rod, said rocker element comprising a jag at its circumference adapted to linearly move a moveable plate of said cartridge;
    a movable rod pivotally connected at a first end to a third axis located at said handle remotely from said first axis and pivotally connected at its second end to said rocker element at a fourth axis located remotely from said second axis;
    wherein the tangential movement of said jag in a direction perpendicular to said longitudinal axis is nonlinearly relative to the rotation of said handle about said first axis where said tangential movement associated with a position of said handle close to the closed position is smaller than said tangential movement associated with a position of said handle close to the fully opened position.

2. The mechanical system of claim 1 wherein said at least one separable movement control is a rotational movement of said handle about an axis perpendicular to said longitudinal axis of said fixed rod.

3. The mechanical system of claim 2 further comprising a second movement control by means of a rotational movement about the longitudinal axis of said fixed rod provided by a second rotational movement of said handle.

4. The mechanical system of claim 3 wherein said first rotational movement control and said second rotational movement control are mutually independent of each other.

5. The mechanical system of claim 4,
    wherein said jag is adapted to provide linear movement of a moveable plate of said cartridge in a direction substantially perpendicular to said longitudinal axis, said linear movement of said moveable plate is nonlinearly relative to the rotation of said handle about said first axis, and
    wherein said handle is adapted to provide rotational movement to said moveable plate about said longitudinal axis via said fixed rod.

6. The mechanical system of claim 1 having a single control lever.

\* \* \* \* \*